United States Patent
Beikirch et al.

(10) Patent No.: US 8,326,045 B2
(45) Date of Patent: *Dec. 4, 2012

(54) METHOD AND APPARATUS FOR IMAGE PROCESSING

(75) Inventors: Lars Beikirch, Pirna (DE); Joachim Ihlefeld, Dresden (DE); Oliver Vietze, Frauenfeld (CH)

(73) Assignee: Baumer Optronic GmbH, Radeberg (DE)

(*) Notice: Subject to any disclaimer, the term of this patent is extended or adjusted under 35 U.S.C. 154(b) by 685 days.

This patent is subject to a terminal disclaimer.

(21) Appl. No.: 12/311,123

(22) PCT Filed: Sep. 19, 2007

(86) PCT No.: PCT/EP2007/008149
§ 371 (c)(1),
(2), (4) Date: Aug. 17, 2009

(87) PCT Pub. No.: WO2008/034599
PCT Pub. Date: Mar. 27, 2008

(65) Prior Publication Data
US 2010/0021058 A1    Jan. 28, 2010

(30) Foreign Application Priority Data
Sep. 19, 2006   (DE) ........................ 10 2006 044 595

(51) Int. Cl.
*G06K 9/48* (2006.01)

(52) U.S. Cl. ......... 382/199; 382/173; 382/203; 382/201
(58) Field of Classification Search .................. 382/173, 382/199, 203, 201
See application file for complete search history.

(56) References Cited

U.S. PATENT DOCUMENTS
2004/0070526 A1   4/2004   Horie

OTHER PUBLICATIONS

Wang et al: "Markov random field modeled range image segmentation", Pattern Recognition Letters 25 (2004) 367-375.*
Leung et al: "Contour Continuity in Region Based Image Segmentation", Computer Vision—ECCV'98, 1998.*

(Continued)

*Primary Examiner* — Matthew Bella
*Assistant Examiner* — Ruiping Li
(74) *Attorney, Agent, or Firm* — Ohlandt, Greeley, Ruggiero & Perle, LLP

(57) ABSTRACT

The invention relates to an image processing apparatus by means of which an image identification can take place in real time and which, with only very little or even no a priori information, is capable of carrying out a pertinent and reliable identification of objects. To this end, the connection probabilities are determined between two contour points in each case, taking into account the distance between the points, by means of a computation mechanism. Further provided is at least one classifier, which takes sets of calculated connection probabilities and selects from them subsets with at least three connection probabilities for possible links between at least three adjacent contour points, one of which is a previously determined central contour point, and, for each subset, sorts out that contour point which is adjacent to the central contour point and which has a possible link with the lowest connection probability to an adjacent contour point, provided that the link does not connect two points that are adjacent to the central point, and subsequently enters the contour points that have not been sorted out in a contour point list with connectors that identify the remaining links to the central point.

25 Claims, 16 Drawing Sheets

IEBVS = integrated real-time image processing system (IRTIPS)

OTHER PUBLICATIONS

International Search Report based on corresponding International application No. PCT/EP2007/008149 dated Jan. 5, 2009.

X. Ren et al., "Scale-Invariant Contour Completion using Conditional Random Fields," Computer Vision, Univ. of California, Berkeley, CA, 2005, 7 pp.

A. D. Sappa et al., "Efficient Closed Contour Extraction from Range Image's Edge Points," Conputer Vision Center, Barcelona, Spain, 2005, pp. 4333-4338.

L. Prasad et al., "Vectorized Image Segmentation via Trixel Agglomeration," Los Alamos Nat. Lab., Los Alamos, NM, 2005, pp. 12-22.

F. L. Miler et al., "Template Based Method of Edge Linking Usng a Weighted Decision," Muroran Institute of Tech., Muroran, Japan, 1993, pp. 1808-1815.

C. Orrite et al., "Curve Segmentation by Continuous Smoothing at Multiple Scales," Dept. of Electrical, Univ. of Zaragoza, Zaragoza, Spain, 1996, 579-582.

P. Bose et al., "Growing a Tree from Its Branches," School of Comp. Science, McGill Univ., Quebec, Canada, 1995, pp. 86-103.

M. Makridis et al., "An Innovative Algorithm for Solving Jigsaw Puzzles Using Geometrical and Color Features," Dept. of Electrical & Comp. Eng., Univ. of Thrace, Xanthi, Greece, 2005, pp. 966-976.

M. Usami et al., "A 1.5ns cycle-time 18kb pseudo-dual-port RAM," Device Development Center, Tokyo, Japan, 1993, pp. 109-110.

R. Zewail et al., "A Reconfigurable, Fully Scalable Integer Wavelet Transform Unit for JPEG2000," Dept. of Electrical and Comp. Eng., Univ. of Alberta, Alberta, Canada, 2005, pp. 798-801.

H. Li et al., "A Boundary Optimisation Algorithm for Delineating Brain Objects from CT-Scans," IRIS Research Group, Dept. of Electrical Eng., Brussels, Belgium, pp. 1553-1557.

R. Seedgewick, "Algorithms in C," XP-002505659, pp. 474-486, 514-515 and 528-532. (No translation).

P. Arbelaez, "Boundary Extraction in Natural Images Using Ultrametric Contour Maps," Univ. of Paris Dauphine, Paris, France, 2006, 8 pp.

L. Lecornu et al., "Simultaneous Tracking of the Two Edges of Linear Structures," Departement Image et Traitement de l'Information, Cedex, France, 1994, pp. 188-192.

International Preliminary Examination Report dated Apr. 7, 2009 corresponding to PCT/EP07/08149.

* cited by examiner

IEBVS = integrated real-time image processing system (IRTIPS)

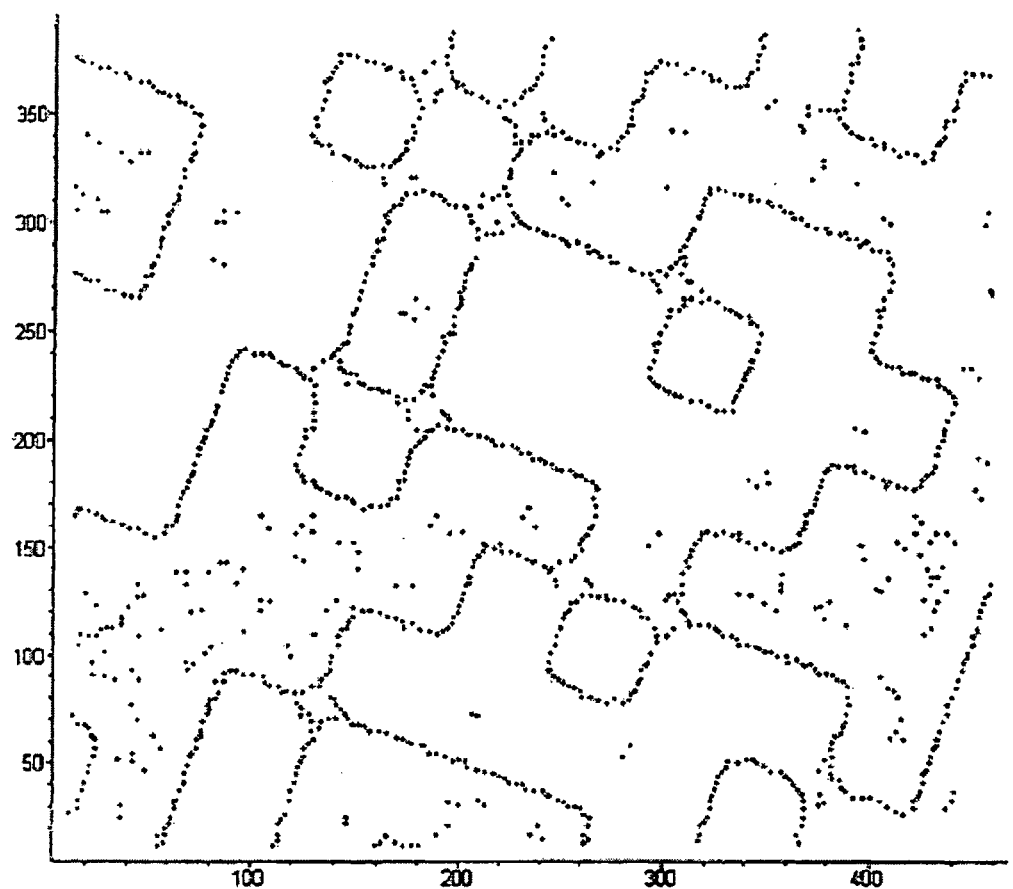
Fig. 2
Fig. 3
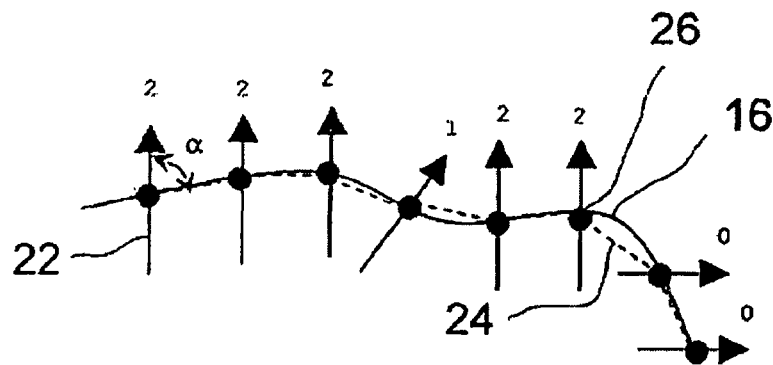

| 23 | 24 | 2 | 3 | 5 |
|----|----|----|----|----|
| 21 | 22 | 1 | 4 | 6 |
| 20 | 19 | CP | 7 | 8 |
| 18 | 16 | 13 | 10 | 9 |
| 17 | 15 | 14 | 12 | 11 |

| Field | X | Y |
|---|---|---|
| CP | 244 | 344 |
| 7 | 249 | 342 |
| 9 | 251 | 339 |
| 13 | 245 | 341 |
| 18 | 237 | 341 |
| 19 | 241 | 342 |
| 22 | 240 | 348 |
| 24 | 239 | 351 |

Fig. 9B

| Xrel | Yrel | ρ | X_Poly | Y_Poly | ρ |
|---|---|---|---|---|---|
| 0 | 0 | 0 | | | 0 |
| 5 | -2 | 5,385 | 2 | -3 | 3,606 |
| 7 | -5 | 8,602 | -6 | 2 | 6,325 |
| 1 | -3 | 3,162 | -8 | 0 | 8 |
| -7 | -3 | 7,616 | 4 | 1 | 4,123 |
| -3 | -2 | 3,606 | -1 | 6 | 6,083 |
| -4 | 4 | 5,657 | -1 | 3 | 3,162 |
| -5 | -7 | 8,602 | 5 | -7 | 8,602 |

Fig. 9C

| Xrel | Yrel | ρ | X_Poly | Y_Poly | ρ |
|---|---|---|---|---|---|
| -5 | -2 | 5,385 | -4 | 1 | 4,123 |
| 1 | -3 | 3,162 | -4 | 1 | 4,123 |
| -3 | -2 | 3,606 | -1 | 6 | 6,083 |
| -4 | 4 | 5,657 | -9 | 6 | 10,82 |

Fig. 13

| Bit | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|
| LINK Info | | | | MASK | | | | | LINK3 | | | | | LINK2 | | | | | LINK1 | | | | | LINK0 | | | | | | | | | | | | |
| Atribute | DIR | | | Contrast | | | | | Colour Info | | | | | | | | | Y-coordinate | | | | | | | | | X-coordinate | | | | | | | | |

Fig. 15

| Bit | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|
| LINK Info | MASK | | | | MASK C1 | | | | S | LinkAdr[0..2] | | | LINK2 | | | | | | | | LINK1 | | | | | | | LINK0 | | | | | | | | |
| Atribute | DIR | | Contrast | | Colour Info | | | | | | | | | | | | | | | | Y-coordinate | | | | | | | X-coordinate | | | | | | | | |

Fig. 16

| Bit | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|
| LINK Info | MASK | | | | CONN33 | | | LINK3 | | | | LINK2 | | | | | | | | LINK1 | | | | | | | LINK0 | | | | | | | | | |
| Atribute | DIR | | Contrast | | Colour Info | | | | | | | | | | | | | | | | Y-coordinate | | | | | | | X-coordinate | | | | | | | | |

# METHOD AND APPARATUS FOR IMAGE PROCESSING

BACKGROUND OF THE INVENTION

1. Field of the Invention

The invention relates in general to apparatuses and methods for image processing. In particular, the invention relates to a method and an apparatus for image processing in which contour points are determined from the image data and, on the basis of the contour points, a segmentation is carried out, during which associated contour points are combined to form objects for further processing.

2. Description of Related Art

Image processing systems are currently used for a wide variety of technical applications in order to effect automatic object identification. For example, industrial robots are frequently oriented on the basis of processed image data, which enable a robot to identify an object and its location and position. In order to ensure a reliable identification of objects, however, a large amount of "a priori" knowledge about the object to be identified has been required up to now. This also often entails the creation of specially tailor-made software solutions for the respective technical field of application. Obviously, such an approach is very elaborate and correspondingly expensive. Also, in this case, technical implementation often additionally entails tedious learning processes, by means of which the system is trained to identify selected objects.

A further drawback is that memory-intensive and complicated calculations are required for the image identification. Therefore, a real-time identification is can hardly be effected in this way.

SUMMARY

The invention is therefore based on the problem of providing a technical solution by means of which an image identification can take place in real time and which is capable of carrying out an appropriate and reliable identification of objects with only very little or even no a-priori information. This problem is already solved in a very highly surprising and simple manner by an apparatus and a method as specified in the independent claims. Advantageous embodiments and enhancements of the invention are specified in the respective dependent claims.

To this end, the invention provides an image processing apparatus having an integrated device in the form of hardware for the segmentation of image data and an integrated device, also in the form of hardware, for the determination and processing of contour points, characterized in that the device for the segmentation of image data comprises a device for the determination of corner points of contours from list data with contour points supplied by the device for the determination and processing of contour points, with the device for the determination of corner points of contours comprising a device for performing the following algorithm:

formed for each point p of a set of successive contour points of a contour are triples with points $(p^-, p, p^+)$, in which the points $p^-, p^+$ represent contour points that are distanced in both directions from point p along the contour, it is tested for these points whether the conditions $$d^2_{min} \leq |p-p^+|^2 \leq d^2_{max}, \quad (i)$$

$$d^2_{min} \leq |p-p^-|^2 \leq d^2_{max}, \quad (ii)$$

and $$\alpha \leq \alpha_{max} \quad (iii)$$

are fulfilled, where $d^2_{min}$, $d^2_{max}$, and $\alpha_{max}$ are set predetermined parameters and where the following applies to the aperture angle $\alpha$:

$$\alpha = \arccos \left[ \frac{a^2+b^2-c^2}{2ab} \right],$$

where a stands for the separation of the points p and $p^+$, b the separation of the points p and $p^-$, and c the separation of the points $p^+$ and $p^+$ and where the conditions (i), (ii), and (iii) are tested for a series of points adjacent to p on both sides, the smallest aperture angle $\alpha$ or a value derived from it from the number of tested triples with points $(p^-, p, p^+)$ that fulfill all of conditions (i), (ii), and (iii) is selected and assigned to the point p, a point p is sorted out when, in relation to it, there exists an adjacent point p' for which the conditions (i), (ii), and (iii) are fulfilled and which has a smaller aperture angle $\alpha$.

In this case, an adjacent point p' is understood to mean a point that is arranged along the contour within a predetermined area surrounding the point p. For example, it is possible to set as a condition the following:

$$|p^2 - p'^2| \leq d^2_{max}.$$

By setting the parameter $d^2_{max}$ the assignment of presumably small aperture angles between far-separated points is prevented in the case of strongly curved contours. The parameter $d^2_{min}$ gives the resolution with which the contour or the contour points is (are) scanned.

A favorably allowed range for $|p-p^+|^2$ for obtaining an effective scanning is further achieved when $d_{max} \geq d_{min}+1$, such as, for example, $d_{max}=d_{min}+2$. The parameters $d_{max}$, $d_{min}$, and $\alpha_{max}$ need not be fixed beforehand by the hardware, but, instead, the image processing apparatus can also be designed such that at least one of these parameters can be selected or varied.

It has been found that the algorithm according to the invention can be implemented in a particularly simple and effective manner in hardware, preferably in FPGA or ASIC modules. In particular, the required memory is also relatively small. Taken together, these lead to a very fast identification of corner points of objects between straight-line segments and a possible further segmentation using these points. In particular, it is then also possible to form quickly links between the corner points and to further process them.

Various selection rules can be applied for the selection of the triples or the points $p^+$, $p^-$. It is especially effective, however, in particular also in regard to the number of required adders and multiplexers, when triples $(p, p^+, p^-)$ which are progressively further distant from the contour point p along the contour are formed successively with contour points $p^+$, $p^-$ and tested for fulfillment of the conditions (i), (ii), and (iii). In this case, it is further advantageous, given adequate accuracy in the determination of corner points for the computation difficulty, when the test of the conditions (i), (ii), and (iii) for a given contour point p is terminated as soon as one of the conditions (i), (ii), and (iii) is no longer fulfilled for a triple (p, $p^+$, $p^-$).

It has proven further advantageous for a low-error segmentation for a large number of conditions in regard to image resolution and image contrast when, in the device for the determination of corner points of contours, the parameter $d^2_{min}$ is set to a value of $d^2_{min} \geq 4$. For the parameter $\alpha_{max}$, in addition, values of $\alpha_{max} \leq 160°$ remain advantageous.

When the conditions (i) to (iii) remain fulfilled for a large number of adjacent contour points, the computational effort for the determination of the minimal aperture angle for the contour point p increases. Therefore, it is advantageous for the computational effort and the speed of the analysis of corner points when the device for the determination of corner points of contours is designed in such a way that, for a given contour point p on either side along a contour, at most 7 contour points are included for the tests of the conditions (i), (ii), and (iii). In other words, the test is terminated when the contour points $p^+$, $p^+$ are each separated by seven contour points from the point p.

Regardless of the object segmentation, the invention provides for a preferably integrated image processing apparatus having one or more image memories and at least one integrated hardware unit, which is designed so as to scan the data of a digital image stored in the image memory and determine contour points with subpixel accuracy and to store this as continuous list data in a memory. The image processing apparatus further has a computation unit, which is designed to use a computation mechanism to determine from the list data stored in the memory the connection probabilities between, in each case, two contour points, taking into account the distance between the points. In addition, at least one computation unit, which is referred to hereinafter as a classifier, is provided, which takes sets of calculated connection probabilities and selects from them subsets with at least three connection probabilities for possible links between at least three adjacent contour points, one of which is a previously defined central contour point, and, for each subset, sorts out that contour point that is adjacent to the central contour point or central point and has a possible link with the lowest connection probability to an adjacent contour point, provided that the link does not connect two points that are adjacent to the central point, and subsequently enters the contour points that have not been sorted out in a contour point list with connectors that identify the remaining links to the central point.

The invention also provides for a method for the determination of associated contours in image data, which can be carried out, in particular, in an image processing apparatus as described above and in which contour points are determined from the image data and the connection probabilities of possible links from contour points to adjacent contour points are calculated and in which, from a set of such connection probabilities, one or more subsets with at least three connection probabilities are analyzed for possible links between at least two contour points and an adjacent selected central contour point and, in each case, that contour point that is adjacent to the central contour point and has a possible link with the lowest connection probability to one of the other points is sorted out, provided that the link does not connect two points that are adjacent to the central point, and, once this analysis of the subsets has been concluded, enters it in a list in an electronic memory of contour point data, which comprise connectors that identify links to the central point that belong to a contour. These connectors can then be further processed by combining the contour points, on the basis of connectors, to form contour segments, which serve for the object processing and object identification.

In the sense of the invention, adjacent contour points are understood to refer not to, for example, contour points in regard to directly mutually adjacent pixels, but rather, instead, to all contour points within a given area surrounding the central point. For example, this may by a 5×5 surrounding area with the respectively considered central point at its center. This set of contour points is then also referred to as the neighborhood.

The determination of the position of contour points with subpixel accuracy in relation to one pixel takes place by calculation from the position of the pixel and further surrounding pixels.

The selection operation according to the invention, in which, in each case, contour points that have the lowest connection probability in relation to the central point are sorted out of a set offers the advantage of requiring very little memory. In particular, the processing can be conducted on the basis of continuous list data. The small memory requirement needed for this even allows processing in real time with little demand in terms of the hardware to be used. In addition, on account of their simplicity, the processes described above can easily be implemented in hardware modules without elaborate software and peripheral circuitry. The apparatus according to the invention can therefore be designed very simply as a very compact integrated hardware image processing apparatus. In order to reduce the required memory, the further processing of the contour points in the form of continuous list data, in particular, is also especially advantageous. These list data preferably contain only the pixel coordinates of relevant contour points as well as attributes of the surrounding area and, accordingly, only the data that is relevant for the contour identification. Accordingly, in this way, the amount of data is reduced to a minimum in comparison to the original data of the image. The sorting out has the purpose of determining those contour points that, together with the respectively considered central point, belong to the same contour.

The step of selecting contour points for the further processing by sorting out contour points with the lowest connection probability in relation to the central point may also be illustrated as follows: The set of contour points (=neighborhood candidates) that are grouped around a central point can be illustrated figuratively in a plane by representing the connection probabilities between contour points by paths, with the length of a path being indirectly proportional to the connection probability. Polygons are now formed, which contain, as corner points, the central point and at least two further contour points adjacent to the central point. Subsequently, those points that are adjacent to the central point and from which the longest link to a further point of the polygon originate are removed. Depending on the number of adjacent contour points, this method can then be repeated for all contour points that are adjacent to the central point, until a certain number of contour points remain, which may, under certain circumstances, depending on the arrangement of the points, also be only two points, including the central point, and no more polygons in which further deletions of elements take place can be formed.

This selection operation of the classifier can be carried out especially effectively with a small number of computation operations and with little demand on hardware when, from the set of contour points in the neighborhood of the central point or of the contour points that are adjacent to the central point, one subset is formed, in each case, as a triple with the central point and two further contour points with the associated connection probabilities and, preferably, of three comparators for the connection probabilities, the lowest probability is determined and, in each case, the contour point that is adjacent to the central point and from which the link with the lowest connection probability within the triple originates is sorted out from a neighboring set of contour points adjacent to the central point, provided that the associated link does not connect two contour points that are adjacent to the central contour point.

The connectors, which the classifier leaves in the neighborhood after the sorting-out operation, are entered in a contour point list and can then contain the indices of adjacent contour points and the connection probabilities in relation to adjacent contour points as well as additional neighborhood information (direction DIR, contrast cont, color).

If the contour points are once again considered as being arranged on a plane with coordinates modified by the connection probabilities, this procedure corresponds to the formation of triples of contour points whose links accordingly form a triangle. In this triangle, the longest side is now determined and the contour point that is adjacent to the central point and from which the longest side originates is deleted.

The sorting-out operation or the selection of the remaining contour points is preferably repeated at least once for the set of contour points that have not been sorted out. The image processing apparatus, in particular the classifier, which, in each case, sorts out the link with the lowest probability from at least three elements for links from at least two contour points to a selected central contour point, may, in particular, be designed so as to repeat the selection operation in which contour points with possible links with the lowest probability are sorted out for each selected central contour point until no further contour points that are adjacent to the central point can be deleted or sorted out.

If, as is particularly preferred, triples of contour points or associated connection probabilities for possible links are formed in each case and a suitable read-out sequence of the contour points is considered, in which the subsets are formed in such a way that only nearest neighbors of contour points or the connection probabilities between these points are included, it has been found, moreover, that precisely one single repetition of the sorting-out operation is sufficient for all triples of connection probabilities for possible links between nearest-neighbor contour points, at least in most cases, in order to sort out all of those contour points that do not belong the same contour as the respectively considered central point.

Under certain circumstances, the selection of contour points by sorting out contour points with low connection probabilities can result in ambiguities, which lead to the situation that, in the case of a triple of contour points, for example, the classifier for the connection probabilities does not sort out any contour point, even though the respectively longest links or the lowest connection probabilities exist for links to the central point in each case. This is particularly the situation when the points with coordinates that have been modified by the connection probabilities form an isosceles triangle or even an equilateral triangle. In this case, all contour points could indeed be accepted, but it was surprisingly found that an appreciably better neighborhood definition, reduced in artifacts, is obtained when a modulation, which corresponds to a shift in position of contour points that is smaller than the pixel spacing, is imposed on the connection probability.

Although this changes the data for the connection probabilities, which can lead to incorrect path decisions about contour points that actually belong to a continuous contour, it has been found that this is not detrimental, because possible incorrect decisions are neutralized on average. A simple, preferred implementation of a modulation, in this case, is the change of the pixel coordinates of contour points. However, it would be equally possible to calculate the connection probabilities within the classifier and then to impose a modulation on these connection probabilities.

In the simplest case, connection probabilities of contour points can be determined on the basis of the distance between these points. The greater the distance between two contour points, the less is their connection probability. It is preferred, however, to detect further attributes of contour points and to have these incorporated into the calculation of the connection probability.

In this case, it has been found to be particularly advantageous when the computation mechanism calculates connection probabilities between contour points on the basis of the distance between the contour points and at least one of the attributes of contrast, color, and direction. To this end, it is provided according to a further development of the invention that the computation unit, which is designed to determine the connection probabilities between contour points from the list data that is stored in the memory, calculates the connection probabilities between contour points on the basis of the distance between the contour points and at least one of the attributes of contrast, color, and direction. One possibility, by way of example, is to calculate, on the basis of one or more attributes, the value of a function of the values of this attribute and then to calculate a connection probability only when the value of the function is greater than or less than a threshold value, depending on the kind of function.

In this case, by way of example, an attribute may be the mean point direction that is output from the contour point processor (the maximum gray-scale contrast lies in one scanning direction). The mean point direction is defined as the sum of the direction vectors of the two contour points belonging to a connector and, as a rule, to a good approximation, is perpendicular to the direction of the connector itself. If two contour points have a similar contour direction, the connection probability increases accordingly, that is, the probability that the two points actually belong to a common contour increases. A further feature is the angle between the mean point direction and the direction of the connector. This angle can be calculated in a particularly simple manner by way of the scalar product of the two vectors and included in the connection probability.

The contrast may be, in particular, the difference in brightness of areas that are adjacent to the contour point and are separated by the contour line. If two contour points have such a similar contrast, the probability that the two contour points lie on a common contour line increases accordingly. If the contrast is inverted, what is generally involved is a thin line whose contours, which, as a rule, run parallel at short separation and might not be linked; that is, in this case, the connection probability is set to zero.

According to this embodiment of the invention, therefore, the integrated computation unit, which is designed to scan the data of a digital image stored in memory and determine contour points with subpixel accuracy and to store them as continuous list data in a memory, is designed to calculate, besides the position of a contour point, at least one further attribute of the contour point and to store this information in the continuous list data. Preferably, an attribute vector with a length of at least 24 bits, preferably with a length of at least 36 bits, is produced by means of the integrated computation unit for a contour point and is stored in the continuous list data. The computation unit, which is designed to determine the connection probabilities between contour points from the list data stored in the memory, can then calculate the connection probabilities between contour points on the basis of the distance between the contour points and at least one further attribute.

In order to be able to process the image data quickly with only little required memory, in particular to determine contour points and connectors from the image data, it is further preferred that the image data is read out in several strips, each of which has a width of more than 1 pixel, preferably at least 16 pixels, and particularly preferred, 26 or 32 pixels. Preferably, in this case, the image data are read out successively in strips that overlap by more than one pixel, preferably by at least 4 pixels, particularly preferred by at least 8 pixels. Although, under certain circumstances, on account of this overlap, connectors will be calculated twice in the overlap region, this additional effort will be more than compensated for by the fact that the individual determined contours can be combined again more easily and with fewer errors.

The image processing apparatus is further preferably designed for real-time image processing. This means that, within the image transfer, a complete determination is conducted for the objects that the contours describe. This real-time processing is made possible, in particular, also by the very simple calculation of the connectors for the contour points.

In order to make possible such a real-time processing, it is further particularly preferred that the apparatus has a dual-port RAM memory and a device for simultaneous storage and readout of list data from the dual-port RAM memory. This memory not only makes possible very short access times, but, in particular, the various processes in regard to image processing can also simultaneously access the data in the same memory. While a first process is writing list data into the memory, another process can simultaneously take list data out of the memory again. However, such memories—for example, on an FPGA—are generally very small. Typically available are memories in the range of 4 kbytes. In this case, only the processing of list data, instead of mapping entire images or image areas in the memory, also makes possible the restriction to such small memories.

A morphology filter is preferably provided as a process downstream of the formation of list data with the connectors. The term morphology filter is used in this connection to characterize the smoothing effect of the filtering operation, even though, in this boundary area, topological characteristics are also exploited.

Thus, according to this embodiment of the invention, the image processing apparatus has a morphology filter computation device, which is designed to filter the contour point list with connectors with respect to at least one of the following characteristics: contour points relating to chains of at most three contour points are deleted; contour points that belong to only one chain that is linked to a longer chain at one end and has at most three contour points are deleted; contour points that form the starting and ending points of chains of associated contour points are identified in the contour point list; contour points that form branching points of at least two chains are identified in the contour point list.

Provided in order to facilitate the chain linking of connectors to form object segments, according to another enhancement of the invention, is also a device for producing ranking vectors for contour points, these ranking vectors reading out the contour point list with connector structure and, in each case, reading in the connector structure of all adjacent points starting from a central point via the connectors and producing a ranking vector that includes the number of branches of the adjacent points and of the central point itself. In this case, the connector structure is scanned with a time delay for entering the connectors in the contour point list. The time delay is provided so that the dual-port RAM under consideration already contains data in which the list data with the connectors are entered and also read out for the formation of ranking vectors. Subsequently, the ranking vector can be mapped via a table or Boolean functions onto a preferably scalar potential function and artifacts are sorted out by means of the potential function. In order to facilitate the later segmentation, a device for reading out the contour point list in organized sequence as an organized series of contour points can be provided, with successive list entries belonging to successive contour points along the contour. This device can determine associated contour points, particularly on the basis of the respective connectors stored in the contour point list.

In the sense of the invention, such an organized list of contour points is also referred to as a "chain." The chains produced in the segmentation process accordingly represent a sequence of organized contour points that reach an ending point proceeding from a starting point. In this case, each of the contour points, as stated, can be assigned attributes by way of a preceding process, including the scanning direction as well as the contrast along the scanning direction.

For the evaluation of the relevance of a chain in this case, it is appropriate to calculate the contrast allocation of the chain or, in general, to calculate the set of contour points belonging to a contour. Chains are evaluated as being relevant when the contribution of the contrast allocation lies above a given threshold. In particular, the further processing of chains or sets of contour points belong to a contour can take place depending on this evaluation. If a chain or set is evaluated as relevant, it is used further; otherwise, among other things, in the case of too low a contrast allocation, the chain or contour point set is allowed to drop out. In other words, chains with too little contrast allocation are sorted out by means of a corresponding device of the apparatus according to the invention. This sorting-out operation need not take place immediately. In any case, it is particularly advantageous to store the contrast allocation as an attribute of a chain or of a set of contour points belonging to a common contour.

The calculation of the contrast allocation can take place particularly advantageously by calculating a scanning direction for the contour point in each case. Independent of the algebraic sign of the contrast, this scanning direction is that direction along which the maximum contrast appears locally in the image surrounding area. Furthermore, the scanning directions need not be the exact directions of the maximum contrast change in the area surrounding the contour point. Rather, the respective scanning direction can be selected from a narrowly limited number of possible directions so as to limit the computation effort. For example, at most 16, preferably 8, or even particularly preferred, only 4 possible directions may be used, which, accordingly, can be represented with correspondingly fewer bits. For the calculation of the contrast allocation of a contour or of the associated chain or set of contour points, the contrast values of the individual contour points can then be accumulated in accordance with their counting direction. The counting direction is determined as a function of the scanning direction and the direction vector of the contour at the contour point and indicates whether the contrast value that belongs to the contour point and has an algebraic sign is added or subtracted during accumulation.

Advantageously, the direction vector, too, like the scanning direction, can be limited to a few directions or to a few possibilities. Just as is the case for the scanning direction, at most 16, for instance 8 or else only 4, different possible directions may be used for the direction vector for calculation of the counting direction.

The sorting out of low-contrast chains takes place in a further development of the invention with a data filtering device, referred to hereinafter also as a "chain filter." It sorts out sets of contour points belonging to a common contour when the set of contour points fulfills at least one of the following conditions: a) the length of the contour is smaller than a given value, preferably 10 pixels, and both the starting point as well as the ending point of the contour have a degree of 1 and are thus not a component part of another contour, b) the length of the contour is smaller than a pre-given value, preferably 10 pixels, and either the starting point or else the ending point of the contour have a degree of >2, c) the starting point and ending point are identical and the length of the contour is smaller than a pre-given value, preferably 10 pixels, d) the contribution of the contrast allocation is smaller than a pre-given value.

A filtering is accordingly conducted not only on the basis of the accumulated contrast, but also on the basis of further criteria, such as, in particular, the structure size.

By means of this chain filter, chains or chain segments that belong to contours that arise from artifacts—for instance, from noise—and do not describe meaningful structures, will be sorted out. The chain filter supplements the filtering described by the morphology filter described above.

It has been found that a low-artifact determination of links between contour points already functions with a small area surrounding a selected central contour point. Thus, a reliable determination of links between contour points can be conducted when connection probabilities for possible links of contour points are calculated, in each case, only in relation to those further contour points, including the central contour point, which are at most 2 to 2.5 pixels away from a contour point in relation to the raster of the digital image.

For the calculation of the connectors, nearly exclusively, only the most closely adjacent contour points are relevant each time. Therefore, computation steps can be saved when the formation of the sets of contour points, in particular of triples for the sorting-out operation, has already been performed skillfully. Provided for this purpose, according to a further development of the invention, is a sorting device, which is connected upstream of the computation unit for the calculation of connection probabilities for possible links between contour points and which outputs list data of contour points that are adjacent to a selected central contour point in each case, in accordance with a sequence that is maintained during scanning of an area surrounding the central contour point by reading out successive, exclusively adjacent points of the surrounding area. This constitutes, by way of example, a difference in comparison to image data in conventional image formats. Here, the data are organized in rows. Although, within one row, successive data of the image file then belong to successive pixels, that is, also adjacent pixels, this does not hold true any longer at the end of the row. Here, there occurs a jump from the last point of the row to the first, far-distant point of the next row.

At first glance, the determination of contour points with subpixel accuracy that is employed or the subpixel raster that is employed seems to contain redundant or superfluous information and accordingly to slow down the subsequent calculations or to make them more complicated. However, for instance, additional points are not calculated, but instead, for each contour point in the raster of the image data, at most one contour point is determined with subpixel accuracy.

As already discussed above, the invention allows an extremely economic use of memory. According to a further aspect of the invention, therefore, an apparatus according to the invention may also be implemented as an integrated image processing apparatus, which has one or more image memories and at least one integrated hardware unit for the determination of contour points from image data, a hardware unit, which is connected downstream of the integrated hardware unit for the determination of contour points, for the determination of links between contour points that belong to a contour, a morphology processor, which is connected downstream of the hardware unit for the determination of links, for the determination of the number of links that originate from contour points from contours to adjacent contour points, as well as a device for segmentation, by means of which objects are produced from the data on the contour points and their links to further contour points, these objects describing the contours of the image data, with the hardware unit for the determination of links between contour points that belong to a contour being assigned to a memory or memory area whose size is at most 20 percent of the total memory for the processing of the image data to objects describing the contours, with the exception of the image memory or memories.

BRIEF DESCRIPTION OF THE DRAWINGS

The invention will be explained below on the basis of exemplary embodiments and with reference to the attached drawings. In this case, the same reference numbers refer to the same or similar parts.

In the figures:

FIG. 2 shows a graphic illustration of the contour point list, FIG. 3 shows schematically a region of a contour with contour points, connectors, and point directions, FIG. 4 shows an organizational principle for reading out the contour points, FIGS. 7, 8, 9, 9A to 9C show an example of a calculation, with FIG. 7 showing an arrangement of adjacent contour points in the subpixel raster, FIG. 8 showing the position of the contour points in the original raster, and FIGS. 9A to 9C showing tables with coordinate values and distances between contour points, FIG. 13 shows the data structure of the data stored by the SNNC for further processing, FIG. 15 shows an example of a data structure of a contour point list after a morphological filtering, FIG. 16 shows an example of a data structure of a contour point list for storing the data of singular points having a rank greater than or equal to 3.

DETAILED DESCRIPTION

Figure 1:
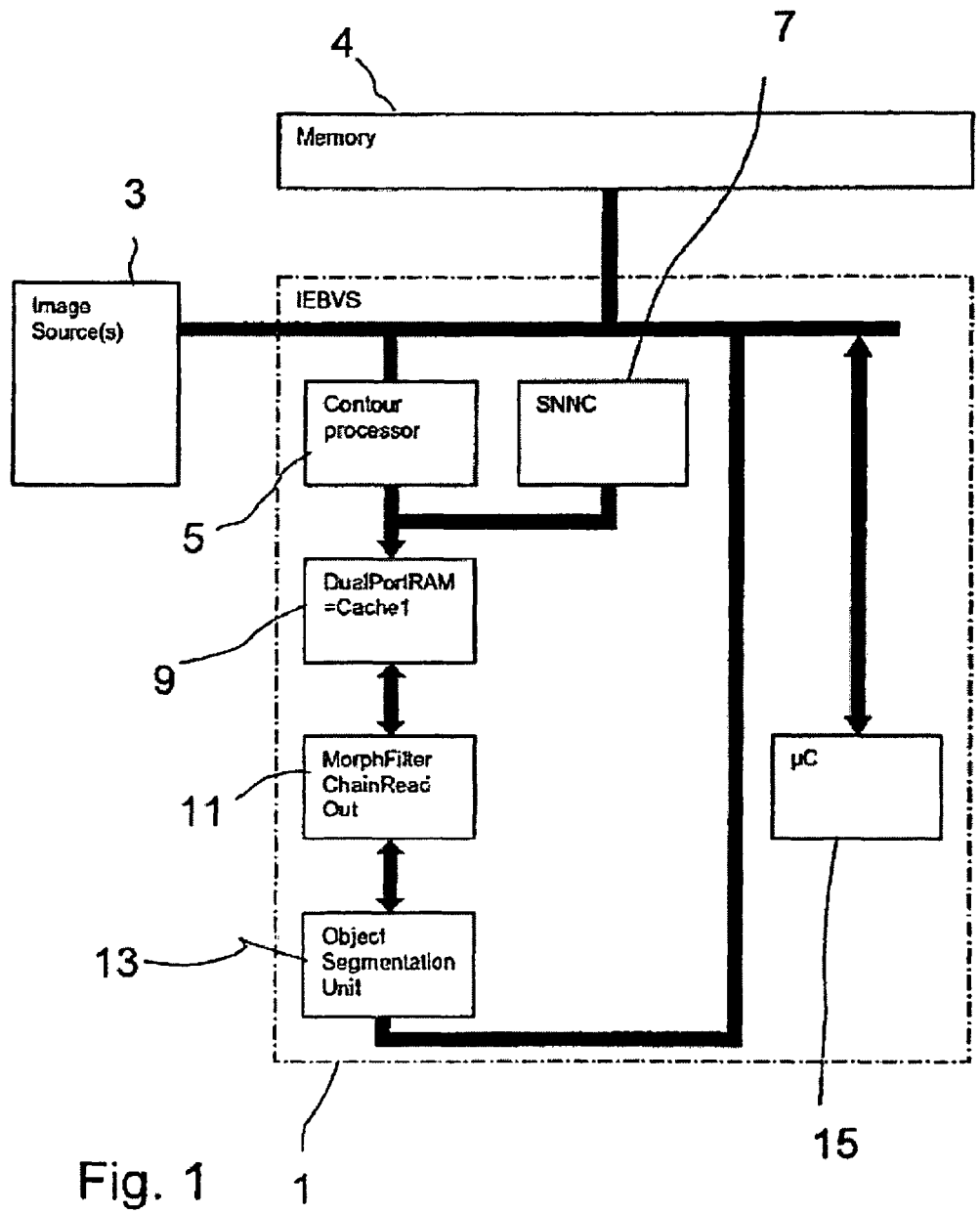
FIG. 1 shows the architecture of an integrated real-time image processing system (IRTIPS)

FIG. 1 shows the structure or architecture of an apparatus 1 according to the invention in the form of an integrated real-time image processing system (IRTIPS). This IRTIPS comprises an image interface to which one or more image sources 3—for example, CCD cameras—can be connected and which stores the image data as a digital image in an image memory 4. A contour point processor 5 in the form of an integrated hardware unit accesses this image memory 4 and is designed to scan data of a digital image stored in the image memory 4 and to determine contour points with subpixel accuracy and to store this information as continuous list data in a memory. The contour point processor 5 delivers the coordinates and selected features of contour points in list form. Features are, for example, gray scales or colors of the adjacent regions, contrasts, or directions.

The coordinates are output with subpixel accuracy within the "regions of interest"—for example, within horizontally arranged strips. In order to process generally valid images, segmentation, that is, the splitting of the image into regions with homogeneous features, is initially preferably advantageous, followed by the interpretation of these features.

FIG. 2 shows a graph illustration of the contour point list. In addition to clear contours—in the example, those of a disturbed data matrix code—there are many points with generally low contrast, which can occur on account of various surface disturbances or as a result of noise. The task of the subsequent processing units is now to describe the structure of the contours lying between the individual regions in organized sequence as a linked sequence of points by using hardware in real time, in order to approximate them in a further step by use of software or additional hardware by digital geometric objects, in particular paths, circles, polynomials, etc., and then to identify them.

The problem of the invention is now solved, in particular, by first establishing the neighborhood of contour points in a statistical nearest neighborhood classifier 7 (SNNC). This SNNC 7 comprises a computation unit, which determines the connection probabilities between contour points, taking into account the distance between the points, from the list data stored in the memory by means of a computation mechanism, and a classifier, which, from sets of calculated connection probabilities, selects subsets with at least three connection probabilities for possible links between at least three adjacent contour points, one of which is a previously determined central contour point, and, for each subset, sorts out the contour point that is adjacent to the central contour point and has a possible link with the lowest connection probability to an adjacent contour point, provided that the link does not connect two points that are adjacent to the central point, and subsequently enters into a contour point list the contour points with connectors that have not been sorted out, which characterize the remaining connections to the central point. These data are then entered in a memory 9. This memory 9 is particularly preferably a dual-port RAM.

Subsequently, by means of a morphological filter 11, which reads out the memory 9, the selection of the relevant contours and the suppression of disturbances that are not relevant take place. In a third step, the contours are read out in organized sequence as linked objects or "chains." On the basis of these chains, a segmentation is then performed by another hardware unit. The course of the process in apparatus 1 is controlled by means of a microcontroller 15.

In order to integrate such a complex structure into a circuit under real-time conditions, a strict pipeline processing is preferably provided. In contrast to known software solutions, which operate on hardware platforms with adequate L2 cache support and can access different data structures in near real time, it is advantageous in a complex integration to take into account restrictions in regard to the memory size, because, on the other hand, in this way, small high-speed SRAM areas, for example, in the form of dual-port RAMs, as in the memory 1 shown in FIG. 1, can be used. Furthermore, there are then expanded requirements placed on the processing quality of the individual substeps, because the pipeline concept imposes restrictions in the case of elaborate search and organization processes or correction processes. A typical memory size for high-speed internal SRAMs lies preferably at 4 to 16 kbytes.

The degree of integration that can be achieved is further determined, in particular, by the power loss, which, in turn, depends on the number of processing steps to be implemented. A particularly advantageous solution with a minimal data flow in the respective process then ensues when a compact list format is used for the representation of contour points, because, for the hierarchically constructed signal processing, only strictly determined access to structure elements is required in each case, so that complex access to image arrays with gray-scale and color data can be avoided.

The task of the statistical nearest neighborhood processor 7 (SNNC) is to connect contour points to form contours. In order to establish the neighborhood of points P[j] in relation to a central point P[i], the connection probability $P_{conn}[i,j]$ of the point set is initially calculated and then classified.

A simple and proven classifier is the distance $$p_{conn}[i, j] = \frac{const.}{\sqrt{(x_i - x_j)^2 + (y_i - y_j)^2}}$$

A point belongs to the neighborhood NBD when $p_{conn}[i,j]$ exceeds a threshold value. Further neighborhood measures can be formed by supplementing $p_{conn}[i,j]$ with measures formed from the scanning directions DIR and/or contrasts cont. In this way, it is possible, for example, to correctly connect points that lie further away with the same direction, but not noise points that are at right angles.

Because further information, including the local contrast cont as well as direction information DIR, is available through an upstream contour point processor, the decision can be markedly improved by expressing the threshold value for the connection decision P as a function of these parameters and as a table and/or ALU according to the following function:

$$p_{conn}[i,j] = \alpha(\Delta x y_{DIR} - \Delta y x_{DIR}).$$

$$\Delta x^2 + \Delta y^2$$

In the relation given above, $\Delta x$, $\Delta y$ stand for the components of the vector representation of a link and $x_{DIR}$, $y_{DIR}$ stand for the components of the mean point direction. The argument of the function $f$ is a maximum when the angle $\alpha$ is 90°.

FIG. 3 shows, for elucidation, a region of a contour 16 on which the contour points 26 lie. The links 24 between the most closely adjacent contour points 26 are drawn as dashed lines. The mean point directions 22 of the contour points 26 are represented as arrows. The mean point directions may be characterized, for example by numbers given on the arrows. In the example shown in FIG. 3, the contour points 26 point to three of the eight possible point directions used here, corresponding to the numbers 0 to 7. As can be seen on the basis of FIG. 3, the angle $\alpha$ is, in each case, the angle enclosed between the mean point direction 22 and the link 24 between two contour points 26.

When the probability $P_{conn}[i,j]$ calculated in this way is greater than a threshold, a link is produced.

In a continuous contour, each central point has, as a rule, only one predecessor and one successor with a spacing that ensues from the pitch of the raster used. However, this relatively narrow definition leads, in practice, to the contours being torn open and stored as separate objects, thus producing a considerable effort in the subsequent processing. For this reason, the task of the SNNC consists, among other things, also in connecting contour points that have a spacing that is greater than the pixel spacing of the scanning raster.

The optimal measure is dependent on the concrete conditions, but it has been found that a value of 2 to 2.5 for the pixel spacing affords a substantial improvement in the contour quality. However, this occurs at the cost of an increase in the number of possible candidates for a neighborhood which will be processed in real time.

The SNNC 7 now has the task of determining the topologically relevant neighbors within the neighborhood NBD. According to the invention, this problem is now solved by forming triples consisting of the central point $p_i$ and any desired combination, from the set, of two additional points $p_{j1}$ and $p_{j2}$ from NBD and by calculating the connection probabilities, $p_{triplet} = \{p_{conn}[i,j1], p_{conn}[j1,j2], p_{conn}[i,j2]\}$.

The triple or triplet given above thus represents a vector with the connection probabilities between all of the links between a selected central contour point and two adjacent points in each case, with all points within at most 2 to 2.5 times the pixel spacing coming into consideration as adjacent points.

If it is found that the connection probability $p_{conn}[j1,j2]$ lies above a pre-given threshold, the triple is analyzed and the link with the smallest probability is deleted. The hardware implementation additionally provides an efficient sorting machine, which initially determines triangles. Because of the test condition, however, only the triangles with the respectively shortest distances on the outer polygon, or the nearest neighbors of the contour points, are relevant. For this reason, operations can be saved through application of organization principles.

FIG. 4 shows a scheme as to how list data of contour points that are adjacent to a selected central contour point are read out by means of a suitable sorting device. The instantaneously selected central contour point is designated "CP." The contour points are stored with subpixel accuracy, there being a maximum of one entry per pixel. For this reason, the triangles described above can be produced by continuous scanning of the neighboring points, for example, in the clockwise direction. The numbers 1 to 24 display the sequence of reading out the contour points within a 5×5 surrounding area with list data. The contour points or their list data are thus read out in the sequence from the image region of a surrounding area with a maximum of 2 pixels spacing from the central point, as they are output in accordance with this sequence by the numbers that are given in the pixels and become list data of contour points. Accordingly, the pixel designated with "1" is read out first, then the pixel designated with "2," and so forth up to the last pixel "24" of this surrounding area. Thus, successive, exclusively adjacent points of the area surrounding the central point are read out.

Figure 5:
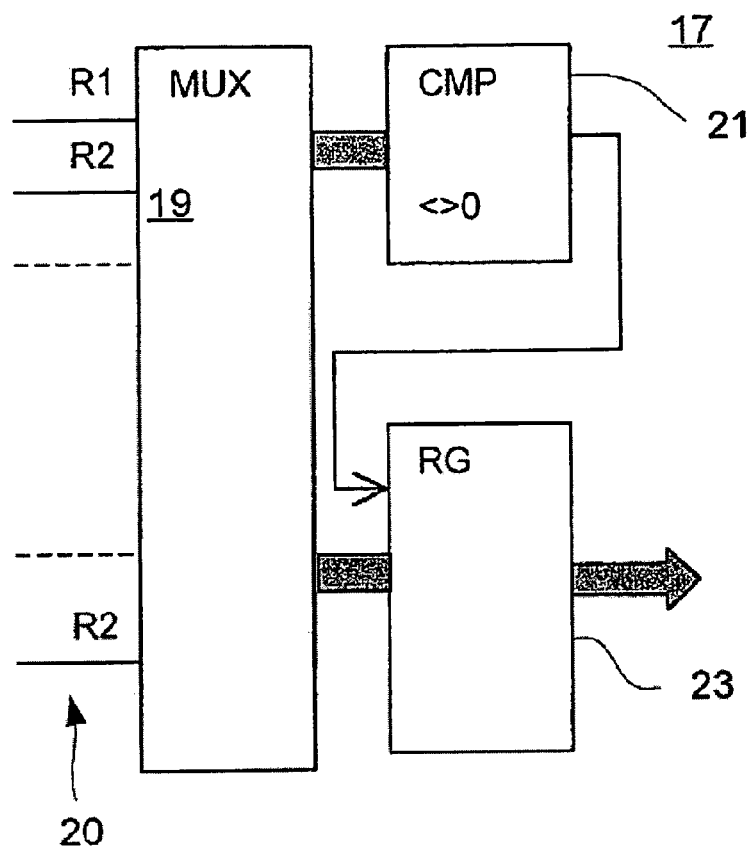
FIG. 5 shows a circuit diagram of a sorting device.

An embodiment of such a sorting device 17 is illustrated in FIG. 5. Used in a dual-port RAM for addressing, for example, is a shift register for the indices (addresses) of the contour points. Whenever a positive decision as a contour point is made for a pixel, this contour point is given the next subsequent address in the dual-port RAM, which, in turn, is inserted in a shift register as the index (part of the address). If the next subsequent pixel is not a contour point, a zero is entered in the shift register. This shift register, with a length of n×m—for example, 5×24—can accordingly store 120 indices. Since contour points are rare, a few bits are sufficient—for example, a word length of 6-8 bits.

Figure 6:
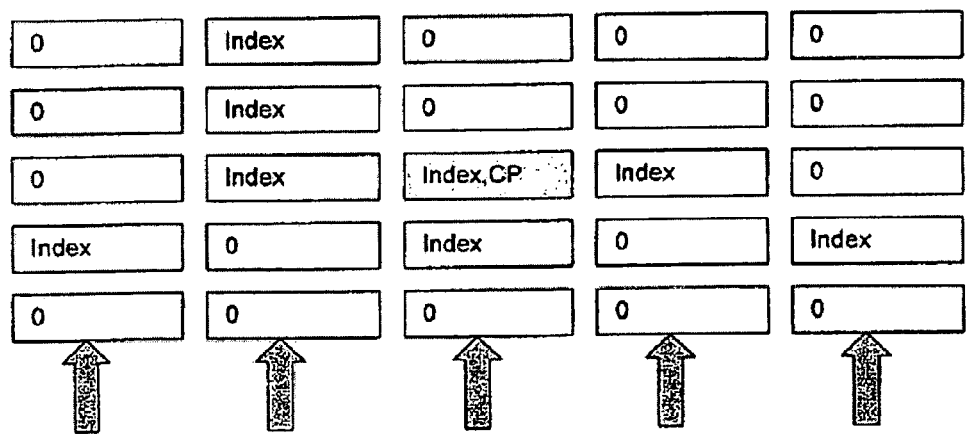
FIG. 6 shows an example of the distribution of contour points in a 5×5 area surrounding a contour point.

FIG. 6 shows an example for a distribution of contour points in the 5×5 area surrounding a central contour point. The entries with the designation "index" indicate that the pixel in question is a contour point. A local 5×5 surrounding area is produced in a known way by taps on the appropriate registers. These registers are now read out via inputs 20 of a suitably connected multiplexer 19 in such a manner that the sequence illustrated in FIG. 4 is produced at the output of the register 23. This process is started precisely when the central point CP is not equal to zero, that is, when a neighborhood to be analyzed is represented in the register record and the point CP is a contour point.

Whenever the output value of the multiplexer 19 is not equal to zero, the index is shifted into an output register 23, which directly addresses data from the dual-port RAM. Whether the output value of the multiplexer 19 is not equal to zero is determined by means of a comparator 21, which acts on the output register 23.

In order to decouple the sorting process from the continuously running contour detection process, further FIFO buffers or registers can be inserted, typically for 8 to 12 contour points, in the output data flow, and then the contour points belonging to a neighborhood can be read out, even repetitively more than once, so that all of the contour point combinations required for the sorting process can be made available. Furthermore, it is possible, in principle, to speed up this sorting process by parallel operation—for example, by connecting two or more multiplexers in parallel.

The allocation with indices illustrated in the example of FIG. 6 corresponds to the surrounding areas of the following calculation example, described on the basis of FIGS. 7, 8, 9A to 9C, for the calculation of connectors between contour points belonging to a common contour.

Figure 7:
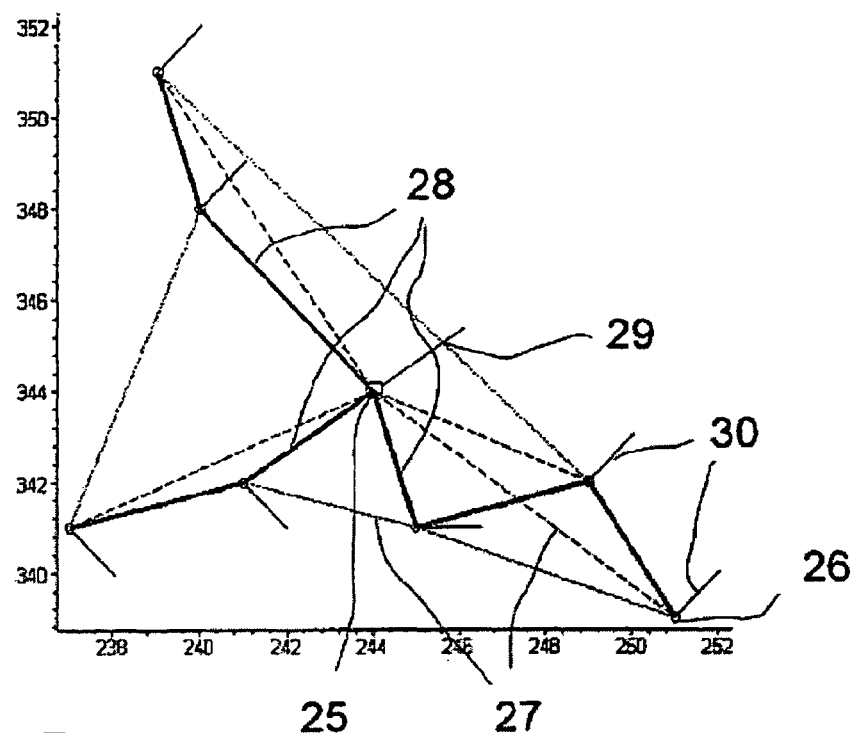
Figure 8:
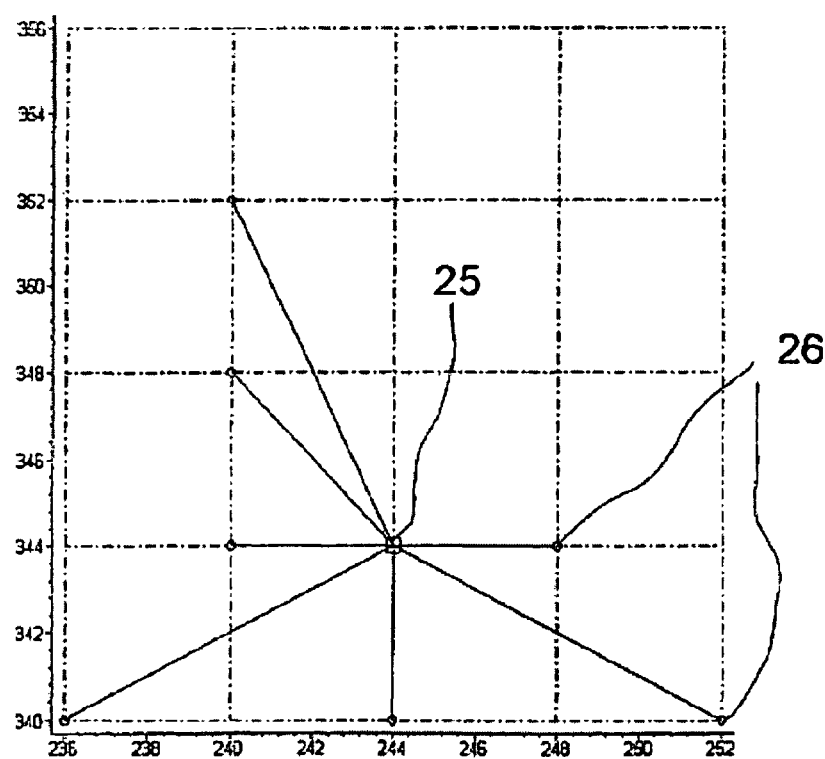

Illustrated in FIG. 7 is, first of all, the position of a central contour point 25 and adjacent contour points 26 with possible links 27 of a contour in the subpixel raster. Plotted here on the axes of the diagram are the indices of the pixels. FIG. 8 shows the same points in the original raster of the image data. On the basis of FIG. 8, it is clear that the relevant adjacent contour points belonging, together with the central point, to a contour in the original raster can be identified considerably more poorly and allow graphs to be formed considerably more poorly.

In the example, the connectors were calculated with a subpixel accuracy of ¼ pixel. This example is illustrated with distances as a measure of the reciprocal connection probability for reasons of simplicity. Illustrated in the left table (FIG. 9A) are the subpixel coordinates (columns X, Y) of the contour point arrangement shown in the upper part. The table begins with the central point CP. Entered in the column designated "Field" are the subpixel coordinates of the contour points, these coordinates ensuing from the scanning according to FIG. 4 for the surrounding area shown in FIG. 6. In the dual-port RAM, in the example, the following contour point sequence is thus addressed: CP, 7, 9, 13, 18, 19, 22, 24, 7. Additionally drawn are the main direction 29 of all contour points of the area surrounding the central point as well as the point directions 30.

The relative distances [Xrel,Yrel] to the central point are calculated from the subpixel coordinates, as listed in the tables of FIG. 9B. The distance p to the central point is, in turn, calculated from this. The pixels with the indices 7, 9, 13, 18, 19, 22, 24, 7 form a polygon at whose center is located the central point CP. The sides of the polygon [X_Poly,Y_Poly] form triangles with the links to the central point, for example, the triangle <CP, "Field" 7, "Field" 9>. In this triangle, the longest side is 8.602 subpixels long and thus longer than the two other sides, which have lengths of 5.385 and 3.606, so that this longest side represents the lowest connection probability between the three contour points. Accordingly, the longest side is deleted from the list of contour points to be connected. This operation is performed for all triangles. In this process, two additional points, that is, a total of three points, are deleted. The contour points with the indices 9, 18, and 24 are especially affected by this sorting-out process. There remain four connectors that have not been sorted out, with one connector connecting the start and end of the polygon. The remaining contour points are listed in the table of FIG. 9C. The sorting-out operation is now repeated for the remaining connectors or contour points. During repeated sorting-out operations, the contour point with the index 12, or the first contour point listed in the table of FIG. 9C, is additionally dropped.

This connector is to be investigated at the end of the analysis, with a further connector being dropped in this case. There then remain the three connectors 28 in FIG. 7, which are stored in the list data. Accordingly, in this example, the result of the calculation is that the connectors from the central point, as a contour point, to the three further remaining points represent the one or more contours to which the central point belongs. After passage through this filter, which is described above on the basis of FIGS. 7, 9A to 9C, the SNNC 7 accordingly provides the information as to which contour points from the contour point list are connected to the central point.

In the case of the example shown in FIGS. 7, 9A to 9C, the sorting-out process was described on the basis of a very simple classifier for the connection probability, namely, a classifier that depends solely on the distance between the contour points. However, the identification of the relevant links between contour points can be appreciably improved if additional attributes of the contour points are used for the calculation of the classifiers. Here, in particular, it is conceived to use the direction and/or the contrast of the contour points. The direction can be a direction vector, for example, which lies perpendicular to the edge in the image data whose contour is to be determined. For simplicity, direction information with a reduced number of possible directions—for example, 8 possible directions—can be determined and stored in this case as an attribute of the contour point processor 5. The direction of a connector then ensues from the connection vector between the central point i and the outer point j of the neighborhood. On the basis of these two direction statements, it is then possible to determine the angle $\alpha$ between the stored mean point direction and the connector. As classifier for the connection probability, it is then possible, for example, to employ a function of the angle $\alpha$—for example, its sine or cosine—and of the distance between the points.

Furthermore, the connection probability can be linked with a contrast measure in order to favor high-contrast over low-contrast contours by, for example, using a multiplication by the magnitude of the mean point contrast of the connecting element for classification of the connection probability. This is particularly of advantage in the case of scenes or thin lines that are overall low in contrast.

Figure 10:
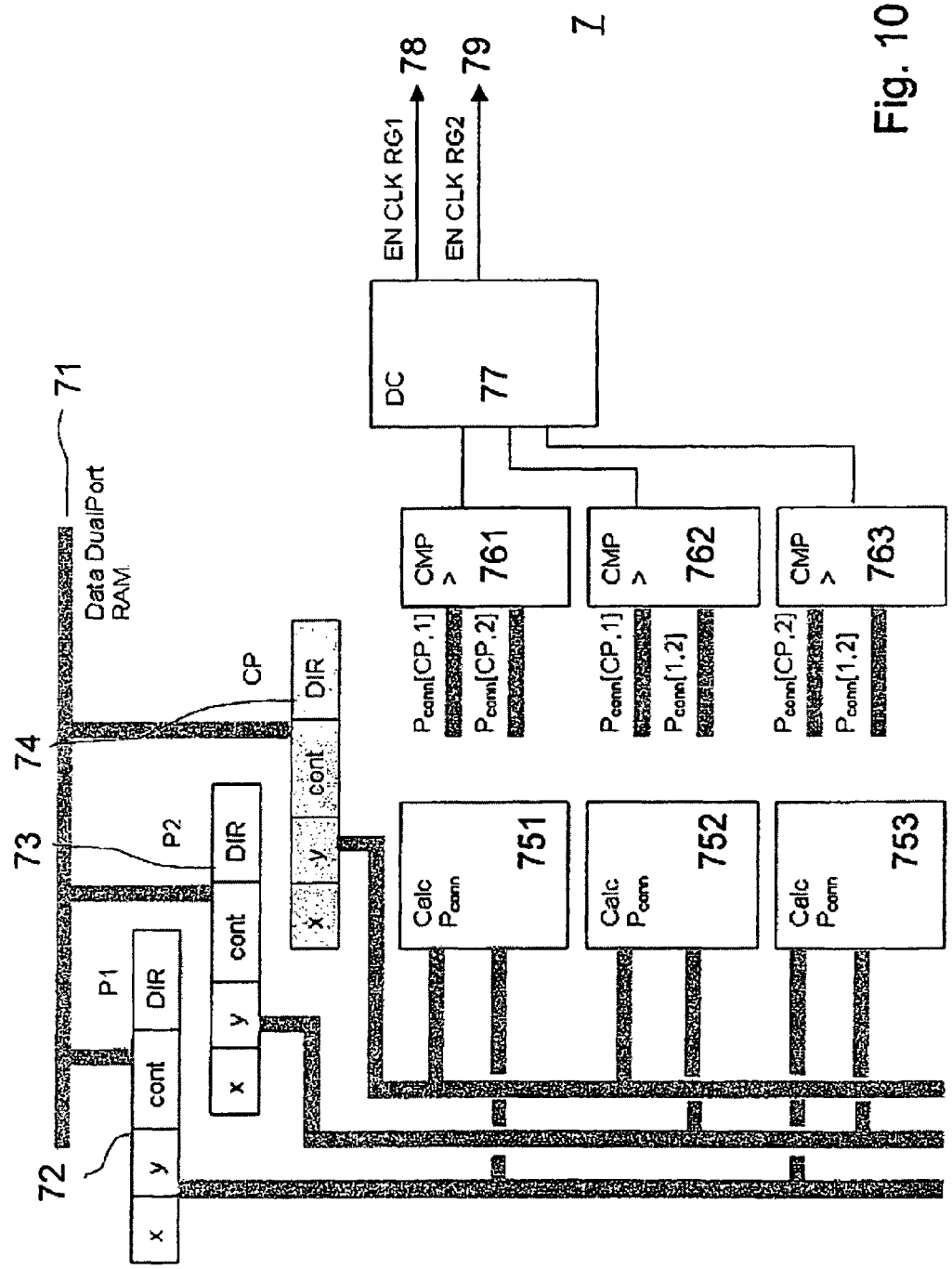
FIG. 10 shows an illustration of an SNNC ("statistical nearest neighbor classifier") for the determination of connectors.

FIG. 10 shows a circuit diagram of an SNNC 7 for the determination of connectors. The mode of operation of the SNNC 7 will be discussed in more detail on the basis of this figure. The contour points can be addressed in the required sequence by the sorting device. The information about the coordinates, a contrast, and the point direction [x, y, cont, DIR] is available at the data input 71 of the SNNC; the data are read into registers 72, 73, 74 with a word length of 32 bits.

Another computation unit 75, which is described in more detail below and is referred to hereinafter as "Calc Pconn," now calculates the connection probability between the three contour points of a triangle. For this purpose, a central point is selected by address decoding. In the example shown in FIG. 10, the data of the central point are loaded into the register 74. Newly arriving contour points are read into the two registers 72 and 73. The three possible combinations of the connection probabilities are analyzed by means of the comparators 761, 762, 763 and the decoder 77, which is connected downstream. If the lowest connection probability between the central point and one of the two points lies on the polygon or if there is no connection to the central point, the link in question is deleted by setting either the bit EN_CLK_RG1 or the bit EN_CLK_RG2 at the outputs 78 or 79, respectively, depending on which of the contour points adjacent to the central point is affected. The indices of the three points under consideration are stored parallel to the data. The index of the point that is not deleted is transferred to a shift register, for which purpose the index difference in relation to the central point is calculated and stored with the next subsequent cycle.

The computation units Calc Pconn 751, 752, 753 receive the sequence of contour points addressed with the register output 23 in FIG. 5, together with their attributes, and calculate the connection probabilities and compare these with one another in conjunction with the comparators 761, 762, 763 and decide in the decoder 77 which links are to be deleted for each analyzed triple. Delivered at the output are the signals EN CLK RG1 and EN CLK RG2 for the contour points P1 and P2, these signals controlling the deletion of links. Subsequently, further triples are analyzed. After an adequate number of processed triples, there remain unmarked links that, as result, refer to connectors, which contain the indices of adjacent contour points and the connection probability of the contour point i with the central point CP as well as with the next subsequent neighbor i+1.

However, the calculation of connection probabilities may result in ambiguities, which are expressed as isosceles or equilateral triangles. In order to avoid morphology disturbances without complicated logic (for example, small triangles in the contours), it may be advantageous to add a computation device so as to impose a modulation on the comparators of the classifier such as, for example, a modulation in the form of a pseudostochastic geometric noise, which produces the impression of a raster that is not quite regular. For this purpose, a marginal noise component—for example, with 10% of the pixel spacing for the coordinate difference for the relative distances $\Delta x$ and/or $\Delta y$ to the central point—is added via a table.

Figure 11:
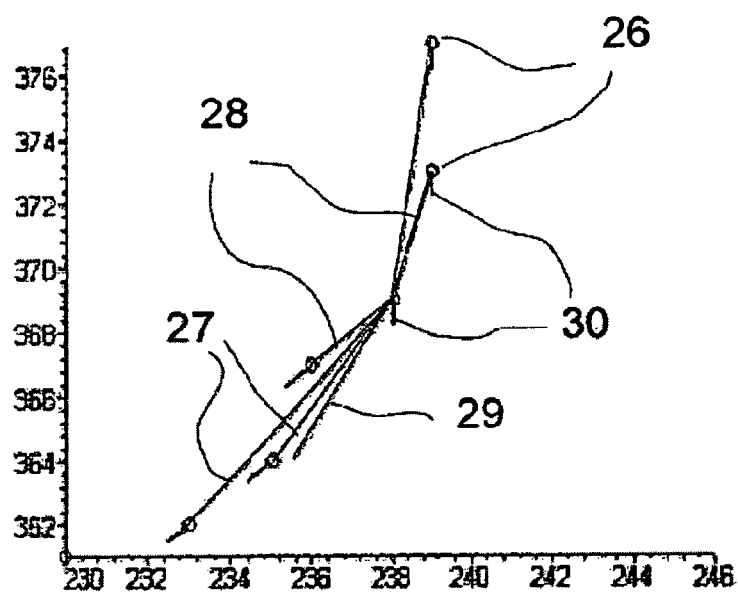
FIG. 11 shows another arrangement of adjacent contour points in the subpixel raster.

FIG. 11 shows a further arrangement of adjacent contour points in the subpixel raster, which was obtained from image data of another place in the digital image. In this example, in contrast to the surrounding area shown in FIG. 7, only two relevant connectors 28 were determined by sorting out from the possible links 27.

Figure 12:
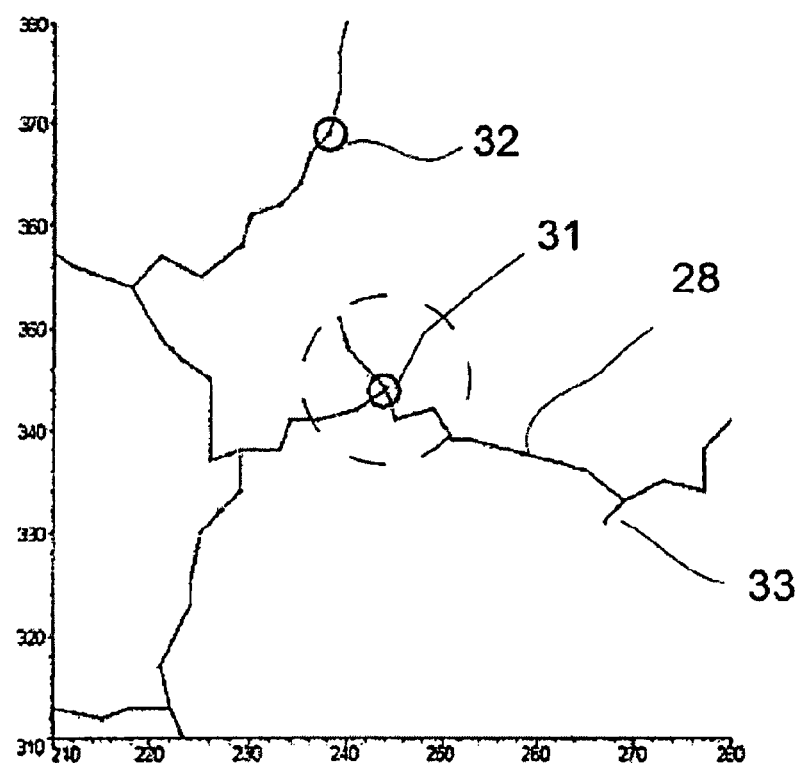
FIG. 12 shows an illustration of a larger image detail with contour points and links determined by a sorting-out operation.

FIG. 12 shows an illustration with contour points and links that are determined by the sorting-out process and represent a larger image excerpt. For clarity, only the links 28 are illustrated. As can be seen from this figure, the connectors 28, which are arranged in a row with one another, result in the course of contours in the digital image. Marked with circles in FIG. 12 are two excerpts 31, 32. The excerpt 31 identifies the three connectors 28, determined from the surrounding area shown in FIG. 7, with a branch originating from the central point. The excerpt 32 identifies the connectors 28 of the surrounding area shown in FIG. 11. The dashed circle shows the region with the surrounding area of all contour points drawn in FIG. 7. It becomes clear on the basis of FIG. 12 that, here, the case of a continuous contour shown in FIG. 11 is more common than the occurrence of a branch.

Moreover, it is clear on the basis of FIG. 12 that this simple sorting-out method leads to an identification of contour lines with only a few artifacts. Otherwise, for example, one would additionally still expect short lines that are isolated or originate from the contour lines. In the figure shown in FIG. 12, only one such short line 33 is to be identified.

FIG. 13 shows the data structure of the data with connectors stored by the SNNC 7 for further processing, preferably in another dual-port RAM, or information on the links of the respective point to further contour points. The information on links to adjacent points is referred to hereinafter also as "LinkInfo."

The index of the central point i forms the address under which the LinkInfo is stored in a dual-port RAM (see further below). Each allowed contour point (EN=1) supplies a further index j (pointer), the difference $LINK[n]=j_n-1$ being referred to as the LINK. With knowledge of the LINKs, it is possible to address all neighbors in the contour list from a central point. On account of the structure of the SNNC, at most 4 LINKS are obtained per central point; five and more neighbors are resolved into several neighborhoods. The mask MASK indicates whether the LINK in question is set or not. Parallel to this, the attributes were stored by the contour point processor in the same memory, so that the coordinates as well as the gray-scale value and, if need be, the color information are available.

The morphological filter 11, schematically illustrated in FIG. 1, will be described in more detail below.

The contour points that are clearly connected in this way cannot yet be read out as objects, because two prerequisites are lacking. First, the starting and ending points of the contours are not yet defined; second, there are still a large number of artifacts, which would unnecessarily burden the resources for the object segmentation. For this reason, the morphology of adjacent points will be investigated by means of the morphological filter 11 before the points are combined to form objects on the basis of the connectors. The morphological filter 11 is now designed to filter the contour point list with connectors with respect to at least one of the following characteristics: contour points relating to chains of at most three contour points are deleted, contour points that belong only to a chain that is connected at one end to a longer chain having at most three contour points are deleted, contour points that form the starting and ending points of chains of associated contour points are identified in the contour point list, contour points that form branching points of at least two chains are identified in the contour point list, coincidences are corrected, and a double linking operation is carried out.

Employed to perform these functions is a function that is implemented in the filter 11 and is referred to hereinafter as the "RankFilter." By means of this function, ranking vectors are formed for contour points. For this purpose, the contour point list of the data structure with connector structure, shown in FIG. 13, is read out and, in each case, starting from a central point, via the connectors, the connector structure of all adjacent points is read in and a ranking vector is produced, which itself includes the number of branches of the adjacent points and of the central point. The RankFilter thus determines the number of links originating from a contour point by forming, in this case, the sum of the set bits of the mask MASK. A quadruple branch would accordingly have a ranking of 4, MASK=1111B; a chain element such as the central point shown in FIG. 11 would have a ranking of 2, and, as a rule, MASK=0011B.

The RankFilter addresses the adjacent LINKS that are allowed via MASK and thus determines the ranking for each contour point of the neighborhood. Formed from the rankings determined in this way is a ranking vector, which contains the structure information on the number of branches of the adjacent points.

Because the connection of the points can be called up from all directions, a double linking with a marking for points that have already been read is meaningful. For this reason, a link address LinkAdr is generated and indicates at which of the four possible positions of the addressed adjacent point the inverse link to the starting point is stored. The LinkAdr is stored after the morphological filtering has been performed.

Because the sequential order of a link to an adjacent point and of the inverse link to the central point always results in the pointer difference of zero, this address can be found relatively easily via comparators. Obtained as a result is a structure that, with only one access, allows the index of the adjacent, connected contour point to be found and linked contour points to be read out with high speed.

Figure 14:
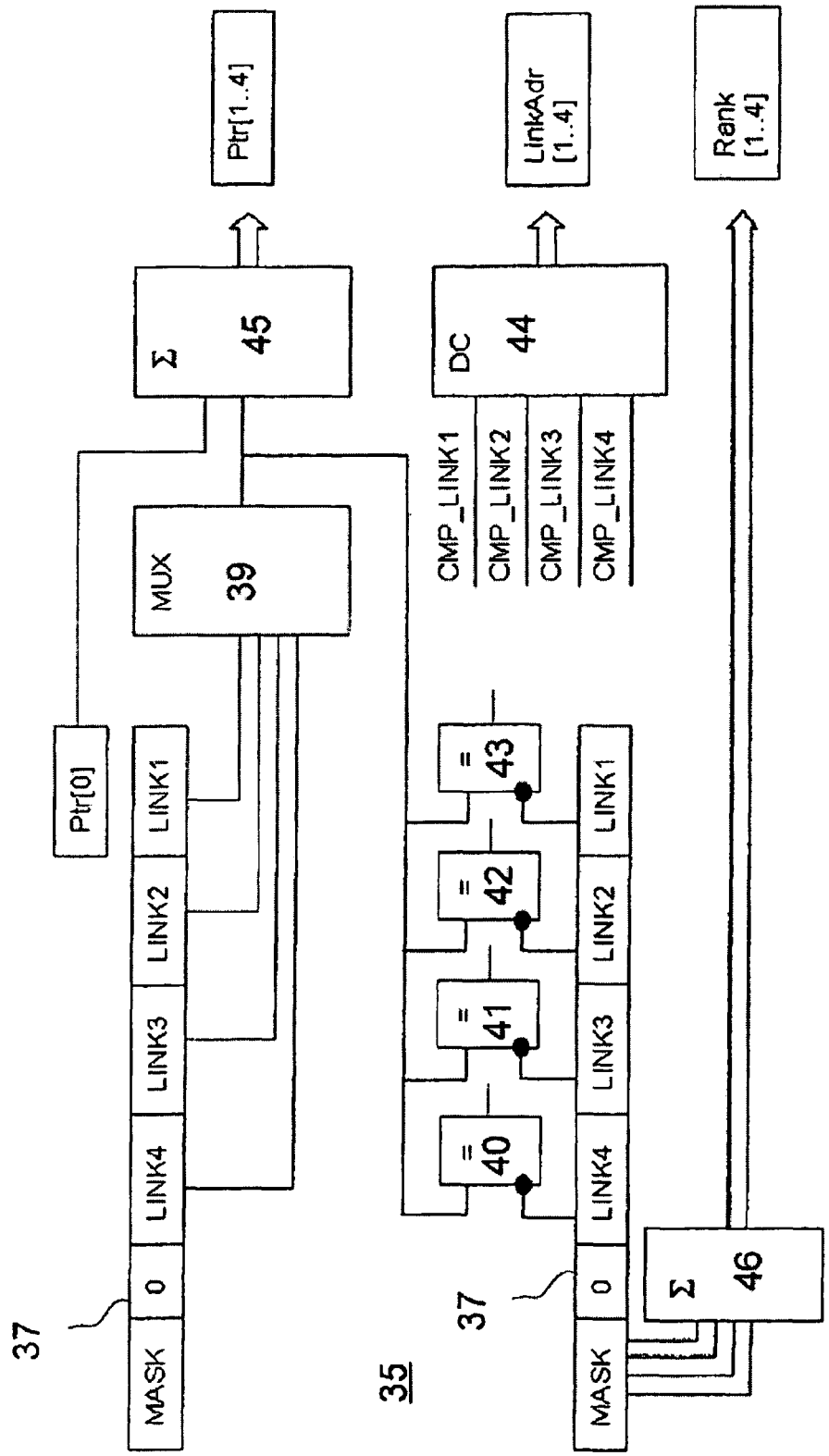
FIG. 14 shows a block diagram of a morphological filter device for producing ranking vectors.

A particularly advantageous implementation of a rank filter 35, preferably as a component of the morphological filter 11, is illustrated in FIG. 14. First, the LinkInfo of the central point with the address Ptr[0] in the dual-port RAM is read into the input register of the rank filter by the rank filter 35 from the data structure 37 from the dual-port RAM 9, as is also shown in FIG. 13. Subsequently, the LINKs 1-4 are addressed via a multiplexer 39 and the addresses Ptr[1 . . . 4] are calculated by addition and called up in order. LINKs that are not required, identified by a zero on the associated bit of the mask MASK, can be skipped over. The pointer address of the central point is added to the relatively stored LINKs by means of the adder 45 and, subsequently, the list can be addressed directly. In this way, the LinkInfos are read in. The connected comparators 40, 41, 42, 43 of the morphological filter 11 or of the implemented rank filter 35 compare the LINKs of the contour point addressed with Ptr[i] with the LINK[i] of the central point. Four (3) comparators compare the LINKs in question. If one of the pairs is complementary to another, the respective comparator 40, 41, 42, 43 generates a signal CMP_LINK[1 . . . 4], so that the LinkAdr can be decoded from it by means of the decoder 44.

In the same process, the ranking RANK[1 . . . 4] can also be determined and combined into a ranking vector <RANK[1], RANK[2], RANK[3], RANK[4]> by adding the mask bits by means of the adder 46. The ranking vector is processed within the morphological filter to make a binary decision on the further allowability of a link that was previously declared to be valid and is stored in the structure MASK.

Furthermore, disturbances in the contours that have been connected as described above and lead, particularly at high resolution and/or sensitivity to a series of small artifacts, which would be segmented on account of their arrangement in relation to objects, are eliminated by means of the morphological filter. This is detrimental to the efficiency of the subsequent processing steps. Therefore, smaller disturbances are already eliminated by means of the morphological filter prior to the object segmentation.

The mode of operation of one function of the morphological filter 11 will be described below. This function is referred to in the following as "MorphFilter." Once the ranking and the LinkAdr have been calculated, a simple filter can be created. To this end, first of all, disturbing small structures, "appendices" with 1 to 2 contour points, are deleted. Such an appendix is, by way of example, the short line 33 in FIG. 12. Structures of this kind are recognized by the number of branches of their neighbors (in brackets)—for example, by the following ranking vector: <1,3,0,0>. The contour point with this ranking vector is connected to the main contour via a singular point of ranking 3. The point is to be deleted and the singularity of the main contour or the branching point reset to a ranking of 2. The operation can be illustrated by the following Maple program code:

if RankVector=[1,3,0,0] then
MASK[Ptr[1],LinkAdr[Ptr[0],1]]:=0: MASK[Ptr[0],1]:=0:
MASK[Ptr[0],2]:=0: end:

The central point has a ranking of 1 and is in first place in the RankVector. LINK[1] of the central point refers to a contour point with a ranking of 3. The LinkAdr[Ptr[0],1] indicates, in this case, where the inverse LINK to the central point is to be found on the contour point with a ranking of 3. Ptr[1] addresses the contour point with a ranking of 3 and hence the operation MASK[Ptr[1],LinkAdr[Ptr[0],1]]:=0: deletes the LINK to a single contour point and the ranking of 3 is reduced to 2. For this reason, the singular point subsequently behaves as a normal component of a linked list; that is, no branching occurs. For the subsequent processing, two objects fewer are generated and the combination of two valid longer objects to form one object is eliminated.

A further example is a contour point with a ranking vector <2,3,1,0>. This is an appendix with two contour points. The two contour points are connected to the main contour via a link of ranking 2 and a singular point or a branching of ranking 3. Such an appendix can be deleted by means of a filter that performs a function analogous to the following Maple code:

if RankVector=[2,3,1,0] then
if LinkAdr[Ptr[2],1]=1 then L:=2
else L:=1; end:
MASK[Ptr[1],LinkAdr[Ptr[0],L]]:=0:MASK[Ptr[0],1]:=0:
MASK[Ptr[0],2]:=0:MASK[Ptr[2],1]:=0:
end:

The edge point with a ranking of 1 is located at LINK[2], LinkAdr[Ptr[2],1] points to the inverse LINK at Ptr[0] (which is the next point as seen from the edge). Because Ptr[0] has a ranking of 2, the other LINK (L) has to point to the singular point Ptr[1] of the main contour with a ranking of 3. Consequently, the function MASK[Ptr[1],LinkAdr[Ptr[0],L]]:=0: deletes the LINK of Ptr[1] to Ptr[0] and reduces the ranking from 3 to 2 and the link is deleted.

The interchange <2,1,3,0> can also be filtered in an analogous manner.

The function "MorphFilter" can supply yet further information that is important for the segmentation by analysis of the ranking vector: classification of the starting and ending points of chains, classification of linked singular points, classification of singular points with a ranking of 3 and higher.

To this end, the ranking vector is mapped onto the target function via a table or Boolean logic. This is marked in the LinkInfo of the contour point list by setting corresponding bits. The data structure for connectors after the filtering by the MorphFilter, illustrated in FIG. 15, has proven to be particularly advantageous in this case. For contour points with a ranking of 2, at most 3 LINKs are needed, because the cutting off of appendices is allowed only for points with ranking of 3.

The additional bits that are contained in comparison to those in FIG. 13 stand for:
C: continue (1 bit for the segmentation)
S: starting/ending point (1 bit),
MASK1: corresponds to bits 0 to 2 of MASK,
LinkAdr: corresponds to the above-described LinkAdr[0-2]; the fourth is not needed.

When the information is later read, the format shown in FIG. 15 is identified by decoding the ranking of the MASK (ranking equal to 2).

Singular points with a ranking greater than or equal to 3 can be coded with the data structure illustrated in FIG. 16. In this case, the entry CONN33 stands for a connector matrix for the connection of singular points of ranking 3 or 4. When the information is later read, the format illustrated in FIG. 16 is identified by decoding the ranking of the MASK (ranking greater than 2). The additional information is used at the time of the segmentation. For this reason, MorphFilter stores the structure in a RAM.

The information of the contour point list prepared in this way can be read out directly from the memory in organized sequence as an organized series of contour points, which is also referred to hereinafter as a "chain," so that successive list entries belong to successive contour points along a contour.

In this case, the chains are determined by using a structure that is referred to hereinafter as GetNextCP. GetNextCP reads the LinkInfo of the central point in a process that is delayed in relation to the MorphFilter. The delay is typically 8 columns, but can also be chosen to be greater for larger memories. ChainReadOut scans the incoming contour points for starting and ending points. These have the features ranking (MASK)=2 and S=1 in the data structure shown in FIG. 15.

When such a point has been discovered, the LinkInfo of the two neighboring points is evaluated and the singular point is sought (ranking of 1 or 3, 4). If only one neighbor with S=1 is found, it is declared to be a starting point. It forms the first representative of a chain. Furthermore, the link to the next point is generated. All elements of the chain are given a new segment number, which is also passed on to all further representatives of the associated point set. If two singular points are adjacent, the first one that is found is used and the remainder ensues automatically. If the "continue" bit was set, the structure of chains is continued.

GetNextCP first determines, on the basis of the MASK, the responsibility that is defined according to a table stored in a decoder. The table supplies the number of neighbors as well as the positions that can be accessed. The pointers to the neighbors and the addresses of the two LINKs are calculated from the LinkInfo in the contour point list.

Figure 17:
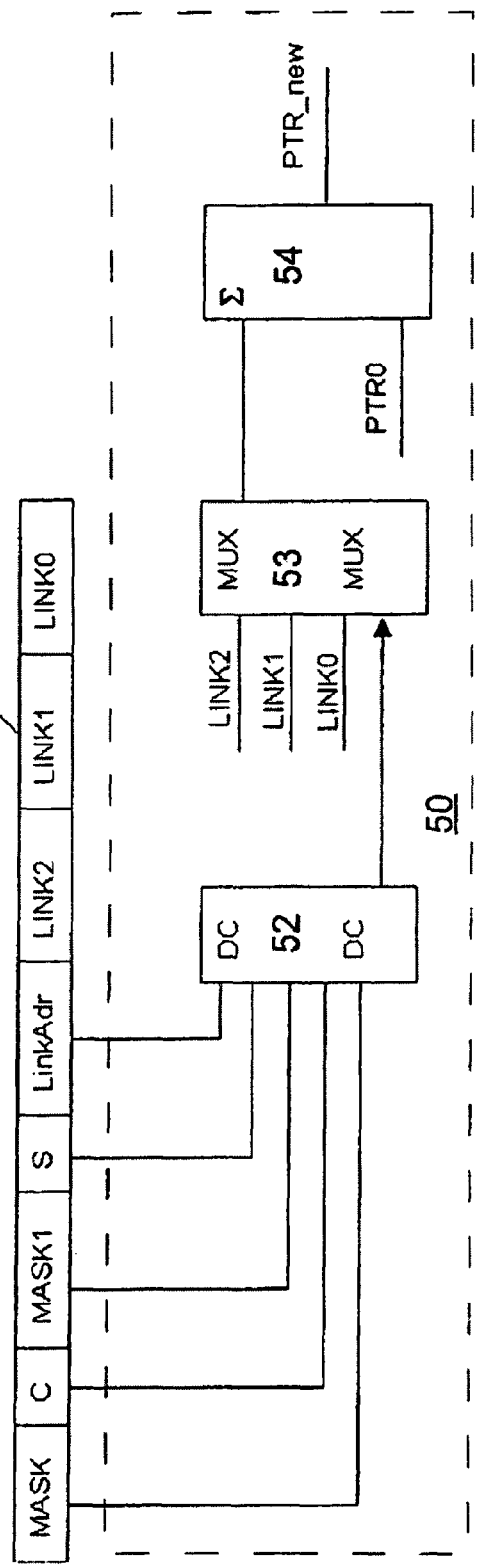
FIG. 17 shows a device for reading out a contour point list in an organized sequence as an organized row of contour points.

One possible structure of the GetNextCP structure 50 is illustrated in FIG. 17. The data structure 51 with the entries MASK, C, MASK1, S, and LinkAdr, corresponding to the data structure illustrated in more detail in FIG. 15, controls the linking to chains. The table mentioned above is stored in the decoder 52.

If a starting point (S=1) was addressed, it has a ranking of 2 and accordingly two neighbors. In this case, the decoder 52 chooses both possible links, decodes the link with a neighbor that does not correspond to a ranking of 2, and sets the starting point of a chain to this contour point by generating the value PTR_Start. The other link is passed along via the multiplexer 53 and the adder 54, as a new pointer PTR_new.

If S=0 is found, that is, if the contour point is neither a starting point nor an ending point, only one link is selected. The selection is controlled via the mask bits MASK1. The generation of a new pointer PTR_new results automatically in resetting of the associated mask bit, so that a repeated addressing of the same contour point is ruled out. Linked contour points are assigned a segment number. Because, starting from this state, LinkInfo is no longer required, the low part of the data word can be used for this purpose.

During the process, the pointer addresses are constantly monitored. If a signal out_of_range occurs, that is, if the allowable index departs from the pre-given lower or upper limit, the process is terminated The C bit (continue) is set at the corresponding contour point and the segment number is stored. If, when it is repeatedly read out, the pointer lies within the allowed range, the process can be continued. Produced at the output of the process is a sequence of pointers that is organized for each segment. Because the corresponding contour point attributes were stored in correlation to these pointers, the attributes can be read out directly.

The following exceptions may additionally occur during the processing of a chain:
1. Both starting points of a chain are processed, so that two different indexed segments abut each other (coincidence).
2. Neither of the starting points is processed, because either the object has no starting point (for instance, in the case of a circle or a closed contour) or because the starting point lies far in front of the current scanning position, so that they cannot be detected.
3. The contour intersects the image boundary (edge points).

In the first case, the chains abut one another with two different segment numbers, but they do not run into one another, because the mask bits prevent this. By way of the test for termination in the case of a ranking not equal to 2, the apparatus can identify that what is involved is a so-called coincidence. The relevant ranking 2 of the coincidence point is treated as a singular point that connects segments to one another, although, in this case, with the difference that only one object is present.

In the second case, a further test is performed after the chain has been read out, the neighborhoods of the type <2,2, 2,x> that have not been processed previously are analyzed, and then a starting point is generated. The further processing takes place as described above. Edge points that can occur between successive strips are treated like coincidence points with a ranking of 2 and subsequently referenced to one another.

The contour point processor supplies, via a first port, a continuous data flow of attributed contour points and, in the worst case, for very finely resolved gray-scale images, approximately 20 to 25% of the pixels are stored as contour points.

An implementation for a conventionally small dual-port RAM of 1k×36 bits, which can also process such a set of contour points, will be described below. This dual-port RAM can be used for temporary storage of an image excerpt with 512 contour points, including the additional information and attributes, this corresponding in the example to a minimum pixel block that is 70×26 pixels in size. The contour point processor reads out the image data in several strips, each of which has a width of more than 1 pixel, preferably at least 16 pixels, particularly preferred 26 or 32 pixels. In the following example, strips with a height of 26 pixels are read out in a meandering shape over the entire image width and subsequently the next strip is read out. The data are stored as a list and the coordinates are kept in the attribute.

The contour point processor 5 begins with the storage of the contour points. Once 5 columns have run in, the SNNC 7 can begin to work, while the contour point processor 5 continues to run.

The maximum pointer address can be calculated exactly. To this end, the address index is stored for each column skip and read out with a delay of 5 columns; in practice, a constant offset of, for example, −32 is also sufficient, because the memory is sufficiently large. The SNNC 7 first reads out 5×5 neighborhoods from the dual-port RAM and stores attributes of the contour points in question in a register record.

The MorphFilter process of the morphological filter 11 requires completely stored and filtered links, for which reason a safety margin of 3 columns is maintained for processing of the data by the SNNC 7.

The segmentation process, on the other hand, requires an even larger separation. The reason for this is the computation-intensive nature of the contour tracking method. In order to avoid an awkward combination of contours, it should be possible to follow the contours over as great a length as possible in an undisturbed manner. A typical value for this is 8 columns. Whenever a starting point or a set continue bit was found from a preceding operation, the GetNextCP structure 50 is abutted.

The control for this is effected appropriately not via the dual-port RAM but rather by a separate simple shift register structure in order to save memory bandwidth.

The SNNC has completed its process after the processing of approximately 3 columns following a storage operation by the contour point processor 5. Consequently, the information required for the MorphFilter is available after the processing of approximately 6 columns by the contour point processor 5.

The contour data pre-processed in this way can be written back into the main memory of the IRTIPS 1 and subsequently formatted by the microcontroller and delivered to subsequent processing operations.

Described in the following is the further filtering of the chains, by means of which artifacts that may arise, for example, through noise in the image data are identified and corresponding chains are filtered out.

To this end, the chains have the form of a sequence of organized contour points, which, originating from a starting point, reach an ending point, with attributes being assigned by an upstream process. Besides the contrast, the scanning direction is also stored as an attribute.

Figure 18:
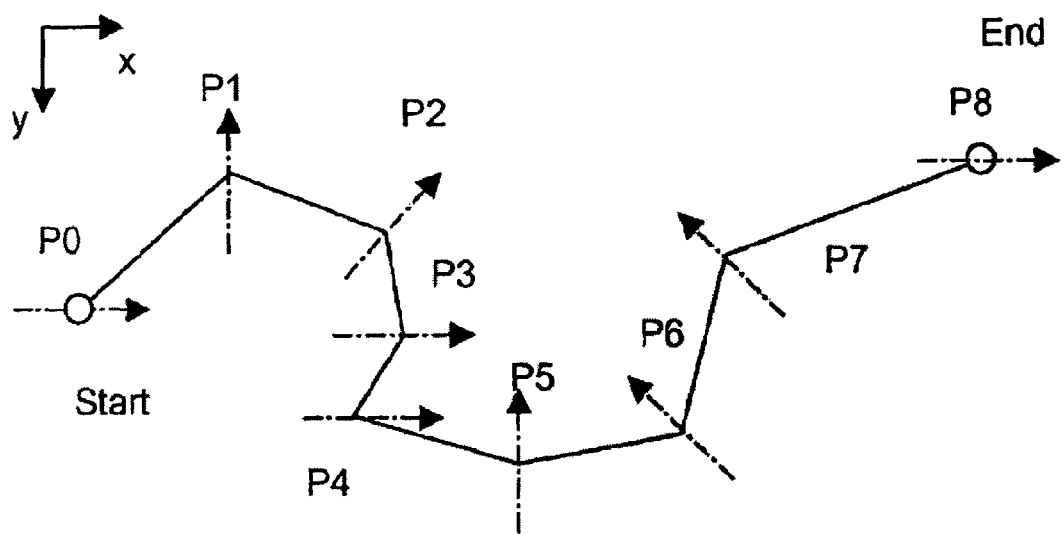
FIG. 18 shows contour points of a chain with sketched-in scanning directions for the determination of the contrast allocation of a contour.

It is meaningful for the evaluation of the relevance of a chain to calculate the contrast allocation. Chains are evaluated as relevant when the contribution of the contrast allocation lies above a given threshold. To this end, the contrast values of the individual contour points are accumulated in accordance with their counting direction. FIG. 18 shows a chain segment with the points P0 to P8, the scanning directions of which are marked by arrows.

Figure 19:
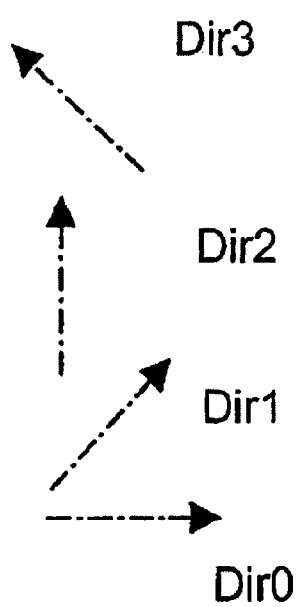
FIG. 19 shows an example of a set of possible scanning directions.

Each contour point is assigned to one of the four scanning directions Dir0, Dir1, Dir2, Dir3 illustrated in FIG. 19. The maximum contrast occurs locally along the respective scanning directions. The following Table 1 lists the contour points and their scanning directions; the other columns will be explained below.

TABLE 1

| Contour point | Direction | Δx | Δy | Counting direction |
|---|---|---|---|---|
| P0, start | 0 | >0 | <0 | − |
| P1 | 2 | >0 | >0 | + |
| P2 | 1 | >0 | >0 | + |
| P3 | 0 | <0 | >0 | + |
| P4 | 0 | >0 | >0 | + |
| P5 | 2 | >0 | <0 | + |
| P6 | 3 | >0 | <0 | + |
| P7 | 3 | >0 | <0 | + |
| P8, end | 0 | >0 | <0 | − |

Evaluated in Table 2 are the difference angles between the scanning directions Dir0 to Dir3 of the contour points and the direction vector [Δx, Δy] of the chain.

TABLE 2

| Direction | Counting direction |
|---|---|
| 0 | $\Delta y > 0$: positive, otherwise negative |
| 1 | $\Delta x + \Delta y > 0$: positive, otherwise negative |
| 2 | $\Delta x > 0$: positive, otherwise negative |
| 3 | $\Delta x - \Delta y > 0$: positive, otherwise negative |

For the coordinate system used here, with the coordinate origin at the top left, as illustrated in FIG. 18, the scanning directions Dir0 to Dir3 result as:
Dir0=[1, 0],
Dir1=[1, −1],
Dir2=[0, −1],
Dir3=[−1, −1].

The column "Counting direction" in Table 2 describes the condition to be fulfilled for a positive counting direction of the contrast allocation of the current contour point. When the chain is formatted, the contrast allocation is accumulated by hardware by first calculating the algebraic sign from the direction Dir and the vector $[\Delta x, \Delta y]=[P_{i+1}-P_i]$. The algebraic signs of $\Delta x$, $\Delta y$, $\Delta x+\Delta y$, and $\Delta x-\Delta y$ are determined for each contour point and linked with the condition according to Table 2. For the chain segment according to FIG. 18, $\Delta x$, $\Delta y$, and the determined counting direction are entered in Table 1. For the last point P8, the direction vector $[\Delta x, \Delta y]$ is not defined, for which reason the direction vector of P7 is used.

Figure 20:
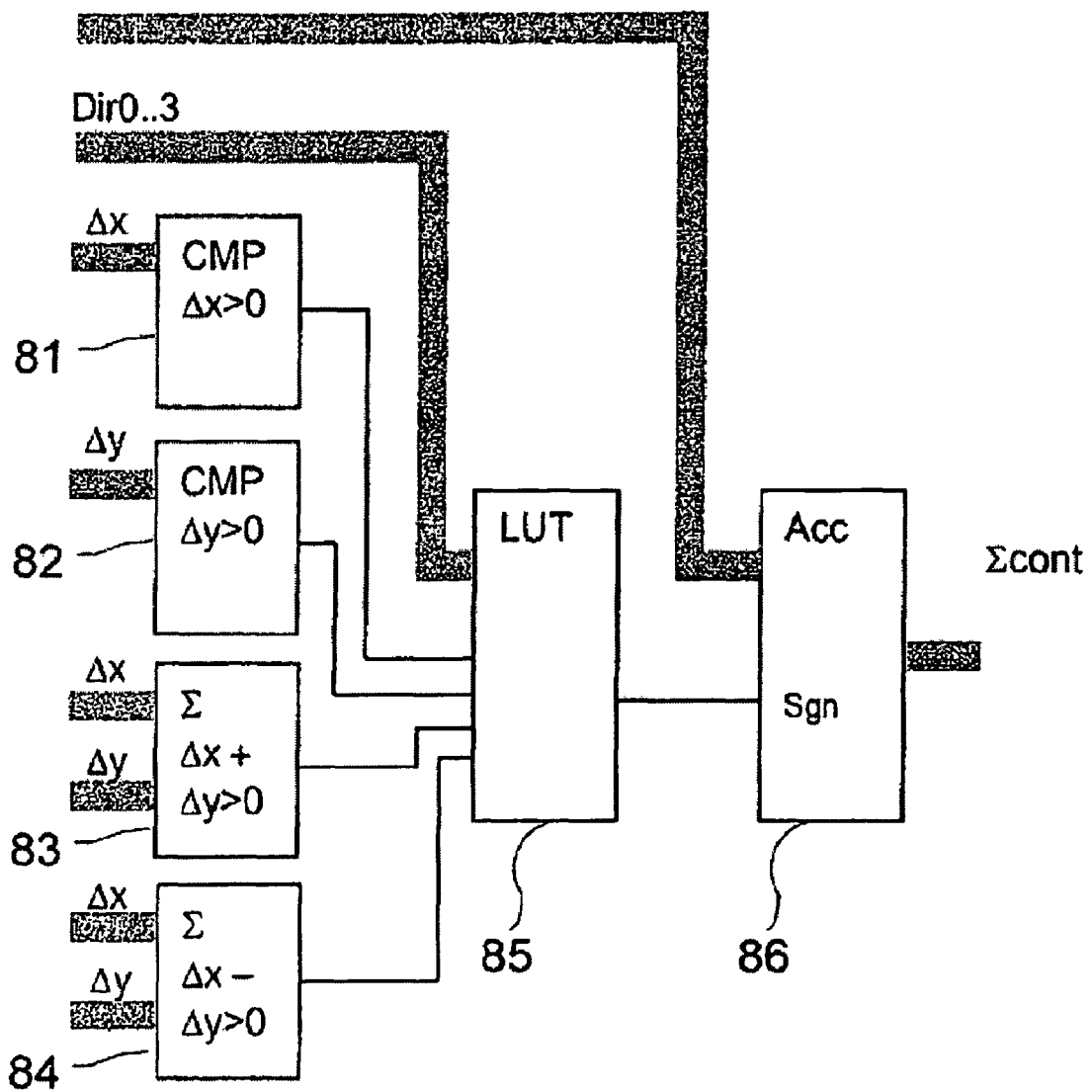
FIG. 20 shows an exemplary embodiment for a contrast accumulator.

FIG. 20 shows the hardware implementation of a contrast accumulator 80 for the determination of the contrast allocation of a contour or of the associated chain. A first step, consisting of two comparators 81, 82 and two adders 83, 84, determines the algebraic sign of the terms $\Delta x$, $\Delta y$, $\Delta x+\Delta y$, and $\Delta x-\Delta y$. A small local memory 85 (LUT) or an equivalent logic circuit decodes the relevant algebraic sign corresponding to the direction Dir0, . . . , Dir3 of the current contour point. Subsequently, the contrast values $Cont_i$ are added in an accumulator 86 with the correct algebraic sign, so that, at the ending point of the contour, the contrast allocation $\Sigma_{cont}$ is taken as the sum of the individual contrast values from the accumulator 86 and can be stored as an attribute of the contour. The contrast allocation thus $\Sigma_{cont}$ thus represents a good approximation for the integral of the differences of the left and right gray-scale and/or color values, as seen from the contour, and accordingly describes the significance of a contour element.

The contrast allocation is subsequently used in a chain filter for the filtering of artifacts. Additionally used in this filter is the degree of the starting and ending point, which is already known through the chain processing, as well as the number of contour points on a chain. These features are referred to and classified as chain attributes. A classifier of the chain filter has the task of deciding, on the basis of the mentioned features, whether what is involved in the current chain segment is a meaningful structure or else an artifact that arises on account of noise, for instance. This chain or the associated chain is subsequently deleted in order to reduce the data volume in the further processing steps.

Table 3 lists conditions of a simple classifier in order to suppress noise-laden chains.

All chain segments that fulfill the conditions listed here are classified as interference and are deleted.

Calculated for the combinations referred to as summary contrast is, in each case, a function of length and contrast allocation, which is then so quantized that the respective chain can be further processed in a topological filter.

TABLE 3

| Degree of the starting point | Degree of the ending point | Summary contrast (absolute contribution) | Length in pixels | Comments |
|---|---|---|---|---|
| 1 | 1 | | <10 | Isolated chains |
| 1 | >2 | | <10 | Short appendages |
| >2 | 1 | | <10 | Short appendages |
| Both points identical | | | <10 | Small circles |
| 1 | 2 | <320 | | Low-contrast chains |
| 2 | 1 | <320 | | Low-contrast chains |
| 2 | 2 | <320 | | Low-contrast chains |
| >2 | >2 | <320 | | Low-contrast chains |

Sorted out with the first condition are chains for which the length of the contour is smaller than a pre-given value, which, in this case, is smaller than 10 pixels, with both the starting point and the ending point of the contour having a degree of 1. Accordingly, in this case, a very short, isolated contour is present.

In the case of the conditions according to the second and third row, small contours are likewise filtered out, with one end of the contour being connected to another contour in this case. Accordingly, what are involved here are short branchings to other contours.

If the starting and ending points of the chain are identical, then the chain in itself represents a closed curve, such as, for instance, a circle. If such a curve is too small, it is filtered out in accordance with the 4th condition of the table, with, in turn, particularly chains of contours with an extension of at most 10 pixels being deleted.

The last four conditions relate to contours whose contour points have a contrast allocation with a summed absolute contrast value that is less than 320. This example shows that, when the relevance of the contrast is evaluated, the length of the contour can also be incorporated advantageously. If a contour with weak contrast is relatively long, the accumulated contribution of the contrast may nevertheless exceed the threshold value and the contour or the assigned chain is evaluated as relevant and is not sorted out.

Figure 21:
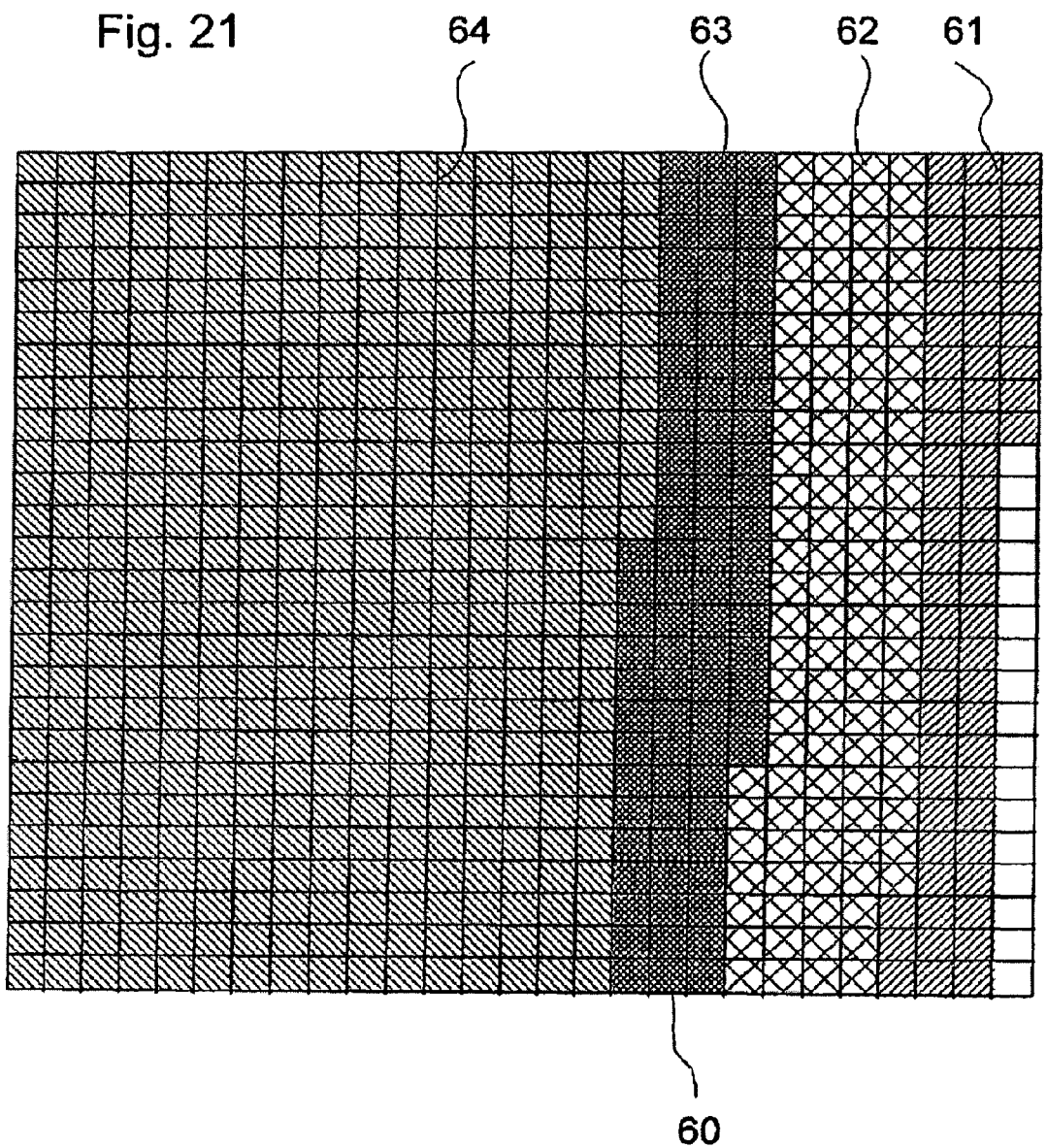
FIG. 21 shows the phase position and the memory requirement of the processes for image processing.

FIG. 21 shows the phase position and the memory requirement of the processes described above for image processing up to segmentation of the image data. The total memory 60 is divided into a memory area 61 for the determination of contour points, a memory area 62, which is used by the SNNC 7, a memory area 63 for the morphological filter 11, and a substantially larger memory area 64 for the segmentation. In this case, a memory or memory area is allocated to the SNNC 7 as the hardware unit for the determination of links between contour points that belong to a contour, the size of this memory being at most 20 percent of the total memory for the processing of image data to the contours describing objects, with the exception of the image memory or memories.

Described below on the basis of FIGS. 22 and 23, which show excerpts of a contour with contour points, is how, on the basis of the determined contour point data as a component part of the object segmentation, corner points of the contours are determined. Illustrated is an excerpt of a contour 16 with contour points 26. The method for the determination of curvatures, particularly of corner points of contours 16, which is carried out by the segmentation unit 13 of the basic configuration illustrated in FIG. 1, is based on the formation of triples with points $(p^-, p, p^+)$ in relation to a point p of the contour points 26 of a contour 16, with the points $p^-, p^+$ representing contour points that are spaced from the point p in both directions along the contour.

Figure 22:
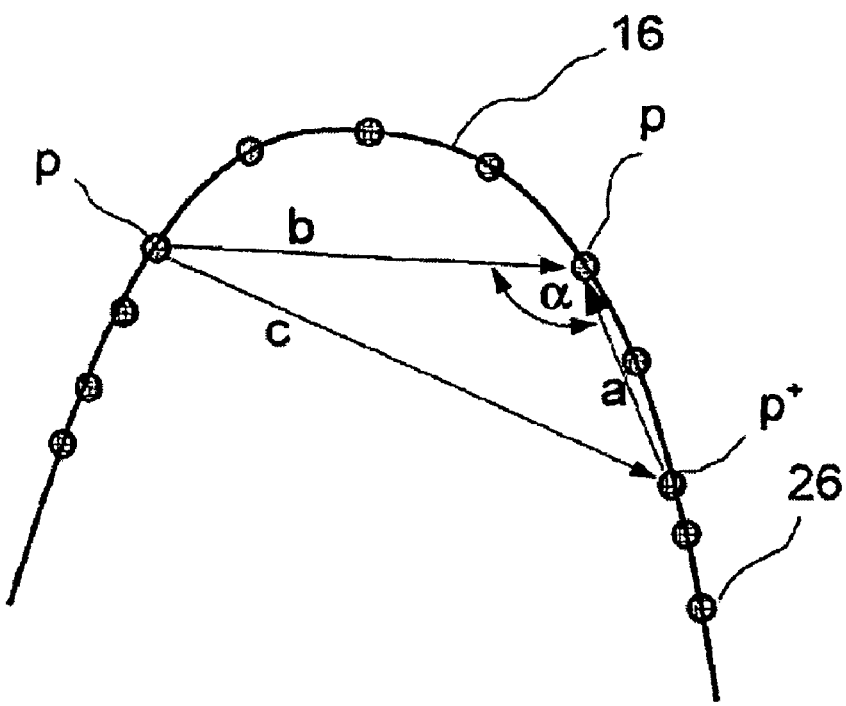
FIGS. 22 and 23 show details of a contour with contour points as well as parameters for the determination of corner points.
Figure 23:
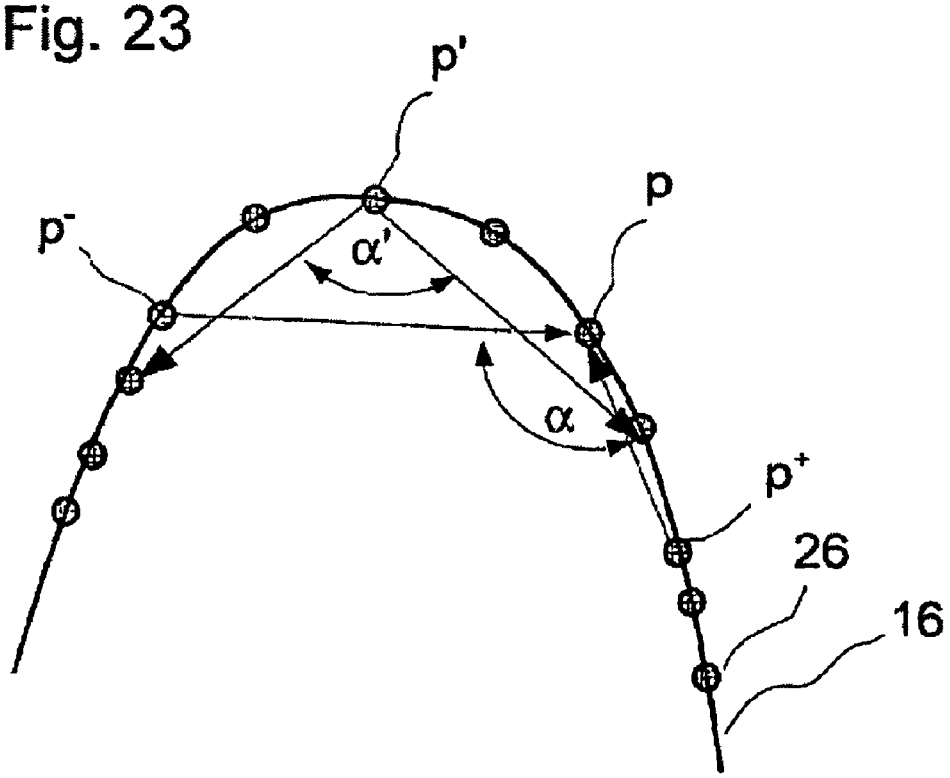

In the case of a contour 16 with a curved profile, as in the example shown in FIG. 22, these points (p⁻, p, p⁺) then form a triangle with sides of lengths a, b, c.

It is tested for these points whether the conditions $$d^2_{min} \leq |p-p^+|^2 \leq d^2_{max}, \quad (i)$$

$$d^2_{min} \leq |p-p^-|^2 \leq d^2_{max}, \quad (ii)$$

and $$\alpha \leq \alpha_{max} \quad (iii)$$

are fulfilled, where $d^2_{min}$, $d^2_{max}$, and $\alpha_{max}$ are pre-given parameters. The aperture angle α is given by:

$$\alpha = \arccos \frac{[a^2+b^2-c^2]}{2ab}$$

where a stands for the separation of the points p and p⁺, b the separation of the points p and p⁻, and c the separation of the points p⁺ and p⁻. On the basis of FIG. 22, it is clear that, in the case of a very large angle α, which approaches 180°, it is rather not to be expected that what is involved for point p is a corner point between two straight-line segments. In order to avoid that even very small curvatures on a contour are interpreted as corners, the angle $\alpha_{max}$ can be appropriately chosen for this purpose. In practice, angles smaller than 160°, such as, for example, $\alpha_{max}=150°$, are often suitable.

The conditions (i) to (iii) are tested in succession for the nearest neighbors of the point p, then the next-nearest neighbors of the point p, etc. If one of the conditions (i), (ii), (iii) is not fulfilled in this case for a triple of the points (p⁻, p, p⁺) the test is terminated. Selected from the aperture angles α of the triple with contour point p that fulfill the conditions (i)-(iii) is the smallest aperture angle, which is assigned to the point p.

If the test of the conditions (i)-(iii) is terminated, then the next contour point along the contour 16 is selected as point p and the process is repeated. The termination can occur, on the one hand, when the conditions (i)-(iii) are not fulfilled for a triple or when a predetermined number of adjacent contour points 26 has been investigated. Preferably, in the latter case, the test is terminated after triples with seven points 26 have been investigated on both sides of the point p. Depending on the requirement, it is also possible to establish a smaller maximum number of triples to be investigated.

If, for a given contour point p, it is not possible to determine a triple that fulfills the conditions (i) to (iii), this point is sorted out in advance and is no longer taken into account in the determination of a corner point.

In a second run, a further sorting-out operation takes place when, for a point p, there exists an adjacent point p' for which the conditions (i), (ii), and (iii) are fulfilled and which has a smaller aperture angle α'. This is shown in FIG. 23. In the example shown, the aperture angle α' of the triple with point p' is, in particular, smaller than the aperture angle α of the triple with point p. By way of this second run, it is avoided that several closely adjacent corner points are determined for a strongly curved contour region that reproduces a corner of an object.

The invention as described above can be implemented, for example, in a compact apparatus in order to identify patterns. Among other things, it is possible in this way to identify and assign raster or form fields in image data regardless of deformations. This makes possible a quick identification and evaluation of forms, such as, for instance, filled-out lottery tickets, by use of a convenient apparatus. The identification is achieved even when the form has folds and bulges, even when the image is recorded at an angle by means of a hand scanner and is correspondingly distorted. The identification of filled-out forms is particularly suited for the invention, because the form data are entered at predetermined locations, so that a simple identification can occur, even without elaborate, software-controlled analysis. The otherwise very complex assignment and identification of patterns, such as, for instance, a raster on a lottery ticket, can be effected completely in the form of hardware in this case by means of a pipeline processing and object segmentation.

It is obvious to a skilled practitioner that the invention is not restricted to the exemplary embodiments described above but, in fact, may be varied in diverse ways. In particular, the features of the exemplary embodiments may also be combined with one another.

The invention claimed is:

1. An image processing apparatus comprising:
   one or more image memories storing image data,
   a first integrated device in the form of hardware for the segmentation of the image data,
   a second integrated device, also in the form of hardware, for the determination and processing of contour points, the second device comprising at least one integrated hardware unit that is designed to scan the image data to determine contour points with subpixel accuracy and to store the contour points as continuous list data in memory,
   a computation unit, which is designed to use a computation mechanism to determine, from the list data stored in the memory, connection probabilities between, in each case, two contour points, taking into account a distance between points, and
   at least one classifier, which, from the connection probabilities, selects subsets with at least three connection probabilities for possible links between at least three adjacent contour points, one of which is a previously defined central contour point, and, for each subset, sorts out a contour point that is adjacent to the central contour point and has a possible link with a lowest connection probability to an adjacent contour point, provided that the possible link does not connect two points that are adjacent to a central point, and subsequently enters the contour points that have not been sorted out into a contour point list with connectors that identify remaining links to the central point,
   wherein the at least one classifier is designed to form, in each case, triples of connection probabilities for the central contour point and two further contour points with associated connection probabilities from a set of contour points adjacent to the central point, to determine a lowest of the connection probabilities, and, in each case, to sort out the contour point that is adjacent to the central point and from which the link having the lowest connection probability within the triple originates, from the neighborhood set of contour points adjacent to the central point.

2. The image processing apparatus according to claim 1, wherein the integrated hardware unit is designed for the purpose of calculating, in addition to the position of a contour point, at least one other attribute of the contour point and to store this information in the continuous list data.

3. The image processing apparatus according to claim 2, wherein the integrated hardware unit is designed to produce an attribute vector with a length of at least 24 bits for a contour point and to store this information in the continuous list data.

4. The image processing apparatus according to claim 2, wherein the computation unit is designed to calculate connection probabilities between the contour points on the basis of the distance between the contour points and at least one other attribute.

5. The image processing device according to claim 4, wherein the at least one other attribute comprises an attribute selected from the group consisting of contrast, color, and direction.

6. The image processing apparatus according to claim 1, further comprising a morphology filter computation device, which is designed to filter the contour point list with connectors with respect to at least one of the following characteristics:
- contour points relating to chains of at most three contour points are deleted,
- contour points that belong to only one chain that is linked to a longer chain at one end and has at most three contour points are deleted,
- contour points that form the starting and ending points of chains of associated contour points are identified in the contour point list, and
- contour points that form branching points of at least two chains are identified in the contour point list.

7. The image processing apparatus according to claim 1, wherein the computation unit is designed to determine, in each case with respect to the central contour point, connection probabilities for possible links between contour points, including the central contour point, which are a maximum of 2 to 2.5 pixels distant from the central point in relation to a raster of a digital image.

8. The image processing apparatus according to claim 1, wherein the classifier is designed to repeat the sorting-out operation for each selected central contour point at least once for the set of contour points that have not been sorted out and are adjacent to the central point.

9. The image processing apparatus according to claim 1, wherein the classifier is designed to repeat the selection operation, in which, in each case, the contour point that is adjacent to the central contour point and has a possible link with the lowest connection probability to an adjacent contour point is sorted out, provided that the link does not connect two points that are adjacent to the central point, for each central contour point until no further contour points can be sorted out.

10. The image processing apparatus according to claim 1, further comprising a sorting device, connected upstream of the computation unit, wherein the sorting device outputs list data of contour points that are adjacent to a selected central contour point, in each case in accordance with a sequence that is maintained during scanning of an area surrounding the central contour point, by reading out successive, exclusively adjacent points of the surrounding area.

11. The image processing apparatus according to claim 7, wherein the computation unit is designed to determine at most one contour point with subpixel accuracy for each contour point in the raster of the image data.

12. The image processing apparatus according to claim 1, wherein the classifier enters into a contour point list the connectors, which contain the indices of adjacent contour points and the connection probabilities to adjacent contour points.

13. The image processing apparatus according to claim 1, further comprising a device for reading out the contour point list in organized sequence as an organized series of contour points, wherein successive list entries belong to successive contour points along a contour.

14. The image processing apparatus according to claim 1, further comprising a device for calculating the contrast allocation of the contour from sets of contour points that belong to a contour and comparing these with a threshold, wherein the device selects a respective scanning direction from one of a number of possible directions that is limited to at most 16 different directions.

15. The apparatus according to claim 1, further comprising a data filtering device, by means of which sets of contour points belonging to a common contour are sorted out when the set of contour points fulfills at least one of the following conditions:
a) the length of the contour is smaller than a pre-given value, preferably 10 pixels, and both the starting point and the ending point of the contour have a degree of 1 and are thus not a component of another contour,
b) the length of the contour is smaller than a pre-given value, preferably 10 pixels, and either the starting point or else the ending point of the contour has a degree of >2,
c) the starting point and ending point are identical and the length of the contour is smaller than a pre-given value, preferably 10 pixels,
d) the contribution of the contrast allocation is smaller than a pre-given value.

16. The image processing device according to claim 1, wherein the image processing apparatus is designed for identification of forms.

17. The image processing apparatus according to claim 1, further characterized in that the device for the segmentation of image data comprises a device for the determination of corner points of contours from the list data with contour points supplied by the device for the determination and processing of contour points, with the device for the determination of corner points of contours comprising a device for performing the following algorithm:
formed for each point p of a set of successive contour points of a contour are triples with points $(p^-, p, p^+)$, in which the points $p^-$, $p^+$ represent contour points that are spaced in both directions from point p along the contour,
it is tested for these points whether the conditions $$d^2_{min} \leq |p-p^+|^2 \leq d^2_{max}, \qquad (i)$$

$$d^2_{min} \leq |p-p^-|^2 \leq d^2_{max}, \text{ and} \qquad (ii)$$

$$\alpha \leq \alpha_{max} \qquad (iii)$$

are fulfilled, where $d^2_{min}$, $d^2_{max}$, and $\alpha_{max}$ are set predetermined parameters and where the following holds for the aperture angle $\alpha$:

$$\alpha = \arccos\,[a^2+b^2-c^2]/2ab$$

where a stands for the separation of the points p and $p^+$, b the separation of the points p and $p^-$, and c the separation of the points $p^+$ and $p^-$ and where the conditions (i), (ii), and (iii) are tested for a series of points adjacent to p on both sides,
the smallest aperture angle $\alpha$ or a value derived from it from the set of tested triples with points $(p^-, p, p^+)$ that that fulfill all conditions (i), (ii), and (iii) is selected and assigned to the point p,
a point p is sorted out when, in relation to it, there exists an adjacent point p' for which the conditions (i), (ii), and (iii) are fulfilled and which has a smaller aperture angle $\alpha$.

18. The image processing apparatus according to claim 17, further characterized in that the device for the determination of corner points of contours is designed to form triples $(p, p^+, p^-)$ successively with contour points $p^+$, $p^-$ and to test for fulfillment of the conditions (i), (ii), and (iii), said triples being progressively further distant from the contour point p along the contour.

19. The image processing apparatus according to claim 17, further characterized in that the device for the determination of corner points of contours is designed to terminate the test of the conditions (i), (ii), and (iii) for a given contour point p once one of the conditions (i), (ii), and (iii) is no longer fulfilled for a triple (p, p$^+$, p$^-$).

20. The image processing apparatus according to claim 17, further characterized in that, in the device for the determination of corner points of contours, the parameter $d^2_{min}$ is set to a value of $d^2_{min} \geq 4$.

21. The image processing apparatus according to claim 17, further characterized in that, in the device for the determination of corner points of contours, the parameter $\alpha_{max}$ is set to a value of $\alpha_{max} \leq 160°$.

22. The image processing apparatus according to claim 17, further characterized in that the device for the determination of corner points of contours is designed in such a way that, for a given contour point p on either side along a contour, at most 7 contour points are included for the tests of the conditions (i), (ii), and (iii).

23. The image processing apparatus according to claim 1, further characterized by a device for calculating the contrast allocation of the contour from sets of contour points that belong to a contour and comparing these with a threshold.

24. The image processing apparatus according to claim 23, further characterized in that the device for calculation of the contrast allocation of the contour calculates in relation to the contour points
   scanning directions along which the maximum contrast occurs locally in the image surrounding area of the contour point as well as
   determines counting directions, which indicate whether the contrast value that belongs to the contour point is added or subtracted during accumulation, depending on the scanning direction and the direction vector of the contour at the contour point, and
adds or subtracts the contrast values of the individual contour points in accordance with their counting direction for accumulation.

25. The image processing apparatus according to claim 1, further comprising one or more image memories and at least one integrated hardware unit for the determination of contour points from image data, a hardware unit, which is connected downstream of the integrated hardware unit for the determination of contour points, for the determination of links between contour points that belong to a contour, a morphology processor, which is connected downstream of the hardware unit for the determination of links, for the determination of the number of links that originate from contour points from contours to adjacent contour points, as well as a device for segmentation, by means of which objects are produced from the data on the contour points and their links to further contour points, these objects describing the contours of the image data, with the hardware unit for the determination of links between contour points that belong to a contour being assigned to a memory or memory area whose size is at most 20 percent of the total memory for the processing of the image data to objects describing the contours, with the exception of the image memory or memories, and with the device for segmentation of image data preferably comprising a device for the determination of corner points of contours list data with contour points, with the device for the determination of corner points of contours comprising a device for performing the following algorithm:

formed for each point p of a set of successive contour points of a contour are triples with points (p$^-$, p, p$^+$), in which the points p$^-$, p$^+$ represent contour points that are spaced in both directions from point p along the contour, it is tested for these points whether the conditions $$d^2_{min} \leq |p-p^+|^2 \leq d^2_{max}, \tag{i}$$

$$d^2_{min} \leq |p-p^-|^2 \leq d^2_{max}, \text{ and} \tag{ii}$$

$$\alpha \leq \alpha_{max} \tag{iii}$$

are fulfilled, where $d^2_{min}$, $d^2_{max}$, and $\alpha_{max}$ are set predetermined parameters and where the following holds for the aperture angle $\alpha$:

$$\alpha = \arccos [a^2+b^2-c^2]/2ab$$

where a stands for the separation of the points p and p$^+$, b the separation of the points p and p$^-$, and c the separation of the points p$^+$ and p$^-$ and where the conditions (i), (ii), and (iii) are tested for a series of points adjacent to p on both sides, the smallest aperture angle $\alpha$ or a value derived from it from the set of tested triples with points (p$^-$, p, p$^+$) that that fulfill all conditions (i), (ii), and (iii) is selected and assigned to the point p, a point p is sorted out when, in relation to it, there exists an adjacent point p' for which the conditions (i), (ii), and (iii) are fulfilled and which has a smaller aperture angle $\alpha$.

* * * * *